(12) United States Patent
Tamasato

(10) Patent No.: US 12,084,833 B2
(45) Date of Patent: Sep. 10, 2024

(54) CONSTRUCTION MACHINE MANAGEMENT SYSTEM, CONSTRUCTION MACHINE MANAGEMENT PROGRAM, CONSTRUCTION MACHINE MANAGEMENT METHOD, CONSTRUCTION MACHINE, AND EXTERNAL MANAGEMENT DEVICE FOR CONSTRUCTION MACHINE

(71) Applicant: J THINK CORPORATION, Nagoya (JP)

(72) Inventor: Yoshinao Tamasato, Nagoya (JP)

(73) Assignee: J THINK CORPORATION, Nagoya (JP)

( * ) Notice: Subject to any disclaimer, the term of this patent is extended or adjusted under 35 U.S.C. 154(b) by 477 days.

(21) Appl. No.: 17/413,842

(22) PCT Filed: Dec. 5, 2019

(86) PCT No.: PCT/JP2019/047573
§ 371 (c)(1),
(2) Date: Jun. 14, 2021

(87) PCT Pub. No.: WO2020/121933
PCT Pub. Date: Jun. 18, 2020

(65) Prior Publication Data
US 2022/0056669 A1    Feb. 24, 2022

(30) Foreign Application Priority Data
Dec. 12, 2018   (JP) .................................. 2018-232862

(51) Int. Cl.
*E02F 9/20*     (2006.01)
*G05D 1/00*    (2006.01)

(52) U.S. Cl.
CPC ......... *E02F 9/2004* (2013.01); *G05D 1/0094* (2013.01); *G05D 1/0219* (2013.01)

(58) Field of Classification Search
CPC .... E02F 9/2004; G05D 1/0094; G05D 1/0219
See application file for complete search history.

(56) References Cited

U.S. PATENT DOCUMENTS

| 5,438,771 A | 8/1995 | Sahm et al. |
| 2017/0002547 A1 | 1/2017 | Omote |
(Continued)

FOREIGN PATENT DOCUMENTS

| JP | H9-500700 A | 1/1997 |
| JP | 2002-340556 A | 11/2002 |
(Continued)

OTHER PUBLICATIONS

Mar. 3, 2020 International Search Report issued in International Patent Application No. PCT/JP2019/047573.

*Primary Examiner* — Andrew J Cromer
(74) *Attorney, Agent, or Firm* — Oliff PLC

(57) ABSTRACT

A construction machine management system includes a detection sensor unit installed in a construction machine that is movable in a work site area and a position recognition unit that recognizes position information regarding a position of work executed in the work site area using a movable work tool included in the construction machine based on a detection result obtained by the detection sensor unit with respect to an external indicator installed in the work site area and a detection result obtained by the detection sensor unit with respect to a movable indicator attached to the movable work tool.

13 Claims, 15 Drawing Sheets

(56) References Cited

U.S. PATENT DOCUMENTS

| | | | |
|---|---|---|---|
| 2018/0218301 A1* | 8/2018 | Shike | ................. G06Q 30/0645 |
| 2019/0249391 A1 | 8/2019 | Kikuchi et al. | |

FOREIGN PATENT DOCUMENTS

| | | | |
|---|---|---|---|
| JP | 2010-066117 A | 3/2010 | |
| JP | 2014-074317 A | 4/2014 | |
| JP | 2015-224875 A | 12/2015 | |
| JP | 2018-184815 A | 11/2018 | |
| WO | 2017/061516 A1 | 4/2017 | |
| WO | 2018/179577 A1 | 10/2018 | |

* cited by examiner

FIG. 2
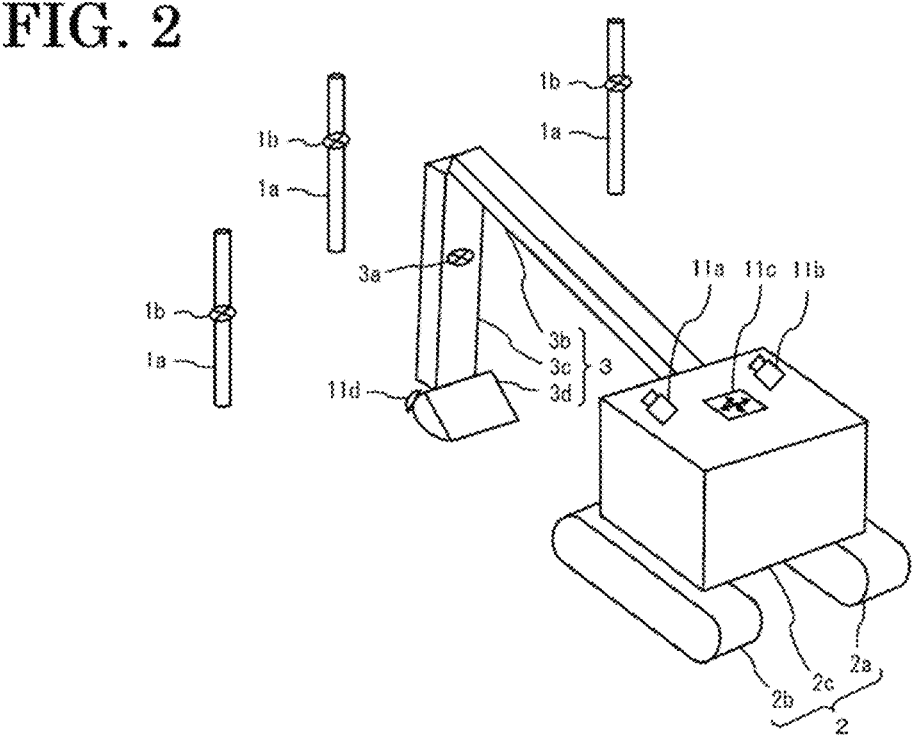
FIG. 3    (a)    (b)
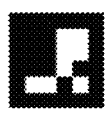  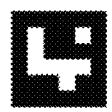

FIG. 8
(a)
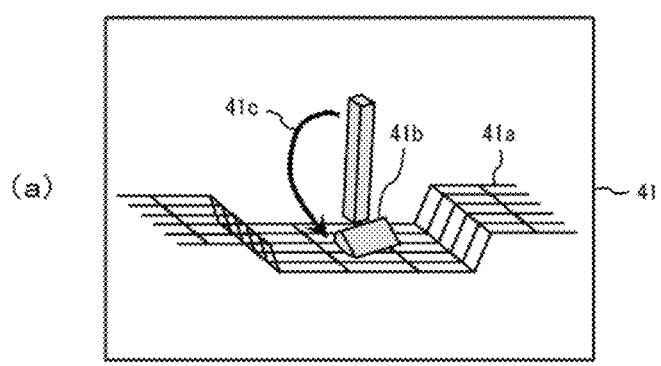
(b)
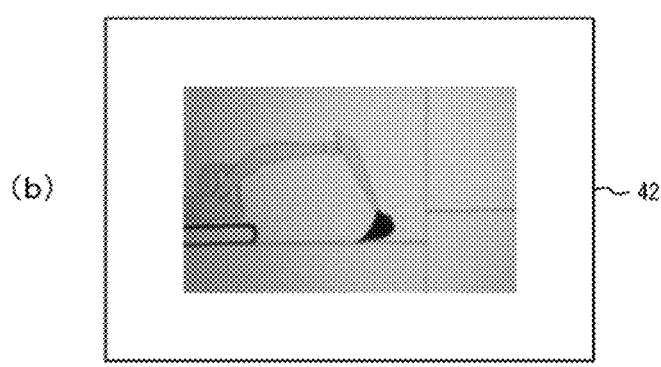

CONSTRUCTION MACHINE MANAGEMENT SYSTEM, CONSTRUCTION MACHINE MANAGEMENT PROGRAM, CONSTRUCTION MACHINE MANAGEMENT METHOD, CONSTRUCTION MACHINE, AND EXTERNAL MANAGEMENT DEVICE FOR CONSTRUCTION MACHINE

TECHNICAL FIELD

The present invention relates to a construction machine management system, a construction machine management program, a construction machine management method, a construction machine, and an external management device for a construction machine.

BACKGROUND ART

In recent years, a position of work that is executed by a construction machine that is used in a work site area is monitored using an electronic device at a construction work site. This is because, if the position of work executed by the construction machine can be recognized, it is possible to manage the work that is being executed by comparing a recognition result with topographic data, for example.

Conventionally, a position of work executed by a construction machine is monitored by installing a laser emission device that is known as a total station (hereinafter also referred to as "TS") in a work site area and using laser beams emitted from the laser emission device, for example (see Patent Document 1, for example). Other than this, there are also cases where a position of work is monitored using a global navigation satellite system (hereinafter also referred to as "GNSS") represented by the GPS (Global Positioning System), for example (see Patent Document 2, for example).

CITATION LIST

Patent Documents

Patent Document 1: JP 2002-340556A
Patent Document 2: JP H09-500700A

SUMMARY OF INVENTION

Technical Problem

In the conventional technologies described above, a position of work executed by a construction machine is monitored using TS or GNSS. That is, monitoring regarding the construction machine is heteronomously performed using TS or GNSS, which is an external system for the construction machine.

However, the following problems may occur in heteronomous monitoring performed using an external system. For example, TS or GNSS is generally expensive and specialized knowledge is required to use TS or GNSS, and therefore it is not necessarily easy to perform monitoring regarding a construction machine using TS or GNSS. Also, depending on the environment, conditions, or the like of the work site area in which the external system is used, laser beams or satellite radio waves that would otherwise reach the construction machine may be interrupted, and there is a risk of this adversely affecting monitoring accuracy.

Therefore, an object of the present invention is to provide a technology that makes it possible to easily and accurately monitor a position of work executed by a construction machine by autonomously performing the monitoring with the construction machine.

Solution to Problem

The present invention was devised to achieve the above-described object, and an aspect of the present invention is as follows.

One aspect of the present invention provides
a construction machine management system including:
a detection sensor unit that is installed in a construction machine that is movable in a work site area; and
a position recognition unit configured to recognize position information regarding a position of work executed in the work site area using a movable work tool that is included in the construction machine, based on a detection result obtained by the detection sensor unit with respect to an external indicator installed in the work site area and a detection result obtained by the detection sensor unit with respect to a movable indicator that is attached to the movable work tool.

Advantageous Effects of Invention

According to the present invention, it is possible to autonomously monitor a position of work executed by a construction machine by using a detection sensor unit installed in the construction machine, and therefore the monitoring can be easily performed with high accuracy.

BRIEF DESCRIPTION OF DRAWINGS

FIG. 2 is an illustrative diagram showing a schematic configuration example of a hydraulic excavator, which is an example of a construction machine that is used in a work site area in a first embodiment of the present invention.

FIG. 3 is an illustrative diagram showing examples of two-dimensional patterns of marker figures that are used in a construction machine management system according to the first embodiment of the present invention. FIG. 3(*a*) is a diagram showing a specific example of a marker figure and FIG. 3(*b*) is a diagram showing another specific example of a marker figure.

FIG. 8 is an illustrative diagram showing examples of operation guidance information output by the construction machine management system according to the first embodiment of the present invention. FIG. 8(*a*) is a diagram showing a specific example of the operation guidance information and FIG. 8(b) is a diagram showing another specific example of the operation guidance information.

FIG. 11(a) is a front view and FIG. 11(b) is a side view of a main portion.

FIG. 12(a) is a front view and FIG. 12(b) is a side view of a main portion.

FIG. 16(a) is a diagram showing a relationship between a camera and marker figures, FIG. 16(b) is a diagram showing a vector in a camera coordinate system, FIG. 16(c) is a diagram showing a model for determining height, and FIG. 16(d) is a diagram showing the model shown in FIG. 16(c) viewed in a direction of OO'.

DESCRIPTION OF EMBODIMENTS

The following describes embodiments of the present invention with reference to the drawings.

1. Outline of Basic Technical Idea

First, an outline of a basic technical idea of the present invention will be described.

Figure 1:
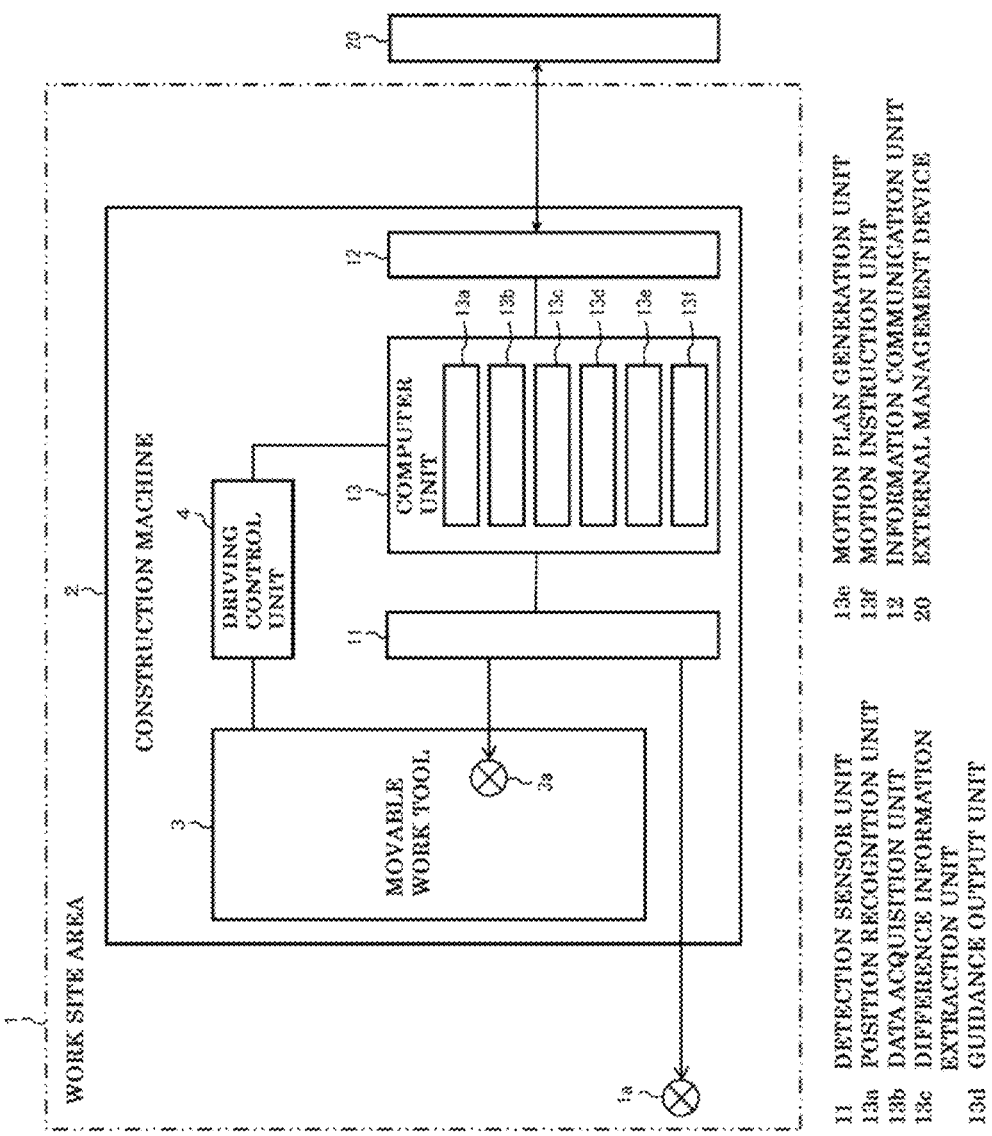
FIG. 1 is a diagram showing a basic technical idea of the present invention and is a functional block diagram showing a schematic configuration example of a construction machine management system to which the technical idea is applied.

FIG. 1 is a functional block diagram showing a schematic configuration example of a construction machine management system to which the basic technical idea of the present invention is applied.

Outline of System

The illustrated construction machine management system is configured to monitor a position of work that is executed using a movable work tool 3 included in a construction machine 2 that is used in a work site area 1 of a construction work site and to acquire a monitoring result (i.e., recognition result regarding the position of work). Furthermore, the construction machine management system is configured to enable management or the like of the work that is being executed based on the monitoring result, upon acquiring the monitoring result regarding the position of work executed by the construction machine 2.

Here, the work site area 1 refers to a region that is a target of work executed using the construction machine 2. Work refers to a construction work or processing that is executed using the construction machine 2. There is no particular limitation on the content (type) of work so long as the work is executed using the construction machine 2.

Also, assume that work plan data that corresponds to design data regarding a state after the work (e.g., topography after a construction work) is prepared in advance regarding the work site area 1. There is no particular limitation on the data format or the like of the work plan data so long as the state after the work can be specified.

Note that the state of the work site area 1 before or during the work and the state after the work that is specified with the work plan data can be associated with each other by using a reference point that is set in the work site area 1, for example.

The construction machine 2 that executes work in the work site area 1 is configured to be movable to suitable positions in the work site area 1. The construction machine may move in the work site area 1 by traveling by itself or using another power source. Also, the construction machine 2 includes the movable work tool 3 that can be operated when the construction machine 2 is stopped or is moving, and the construction machine 2 is configured to execute work in the work site area 1 by operating the movable work tool 3. A position of work executed using the movable work tool 3 by the construction machine 2 is a position at which the movable work tool 3 actually comes into contact with a work target object (e.g., the ground).

Representative examples of the construction machine 2 include construction machines for civil engineering such as a hydraulic shovel and a bulldozer. In the case of a hydraulic shovel, for example, a bucket (shovel) that is attached to a leading end of an arm corresponds to the movable work tool 3. However, the construction machine 2 referred to here is not limited to construction machines for civil engineering and encompasses various work machines in a broad sense so long as the construction machine includes the movable work tool 3 and is configured to be movable. For example, the construction machine 2 referred to here encompasses transporting machines such as a truck and a car transporter, cargo-handling machines such as a crane, foundation work machines, boring machines, tunnel construction machines, concrete machines such as a crusher, paving machines, and road maintenance machines, in addition to construction machines for civil engineering such as a hydraulic shovel and a bulldozer, and can further encompass snow compactors and self-propelling mowers.

Findings by the Inventor

Incidentally, it is preferable that a position of work executed using the movable work tool 3 of the construction machine 2 can be easily monitored with high accuracy. However, according to the conventional technologies described above, monitoring is heteronomously performed using external systems, and therefore the monitoring cannot be necessarily performed easily with high accuracy.

A position of work is monitored to enable management or the like of the work that is being executed, based on a monitoring result, for example. Accordingly, it is not sufficient to recognize the position of work with an accuracy on the order of several meters through the monitoring, and the position needs to be recognized with a high accuracy on the order of at least several centimeters. Monitoring can be performed with such a high accuracy if TS or GNSS, which is very expensive, is used, but it is not necessarily easy to introduce TS or GNSS due to its high cost. Furthermore, specialized knowledge is required to use TS or GNSS, and therefore there is also a problem in terms of convenience. That is, it is not necessarily easy to perform monitoring with a high accuracy using an external system such as TS or GNSS.

Also, it is envisaged that the work site area 1 is set under various environments and conditions. More specifically, the work site area 1 may be set at a place such as an urban area where it is necessary to restrain from emitting laser beams or a place such as an underground space that satellite radio waves do not reach. Therefore, if monitoring is performed using an external system, laser beams or satellite radio waves may be interrupted depending on the environment or conditions of the work site area 1, and there is a risk of this adversely affecting monitoring accuracy.

The inventor of the present application carried out intensive studies based on the foregoing and arrived at the idea that it would be possible to easily and accurately monitor a position of work executed by the construction machine 2 if the monitoring is autonomously performed by the construction machine 2 using a detection sensor unit 11 that is installed in the construction machine 2. That is, the basic technical idea described here was conceived based on a new unconventional idea of autonomously monitoring, by the construction machine 2, a position of work executed by the construction machine 2, rather than heteronomously monitoring using an external system.

System Configuration Example

Specifically, as shown in FIG. 1, the construction machine management system has the following configuration. That is, the construction machine management system includes at least the detection sensor unit 11 installed in the construction machine, an information communication unit 12 that exchanges information with an external management device 20, and a computer unit 13 that is connected to the detection sensor unit 11 and the information communication unit 12.

The detection sensor unit 11 is used to detect the position, attitude, or orientation of the construction machine 2 or the movable work tool 3 included in the construction machine 2. Here, the position refers to a coordinate position of a case where the work site area 1 is taken to be a three-dimensional coordinate space. The attitude refers to an amount of inclination relative to a horizontal plane. The orientation refers to a travelling direction or a movable direction.

The detection sensor unit 11 is constituted by, for example, at least one of an image sensor (camera), an inclinometer, an acceleration sensor, and a gyroscope sensor (angular acceleration sensor), and is preferably constituted by an appropriate combination of any of these sensors. It is also conceivable to use a plurality of GPS devices of an independent measurement type as the detection sensor unit 11.

The information communication unit 12 is for establishing communication with the external management device 20. The information communication unit 12 may be an information communication unit that establishes communication with the external management device 20 using a known wireless communication technology such as an LTE (Long Term Evolution) line, Wi-Fi (Wireless Fidelity), or Bluetooth (registered trademark), for example.

The external management device 20 that is a communication partner for the information communication unit 12 is, for example, a computer device that is disposed away from the construction machine 2 (inside of the work site area 1 or outside of the work site area 1). However, there is no limitation to such a computer device and, for example, a portable tablet terminal can also be used as the external management device 20 so long as the tablet terminal has functions equivalent to those of the computer device. If the external management device 20 is portable, a person holding the external management device 20 can use the external management device 20 in a state of riding in the construction machine 2.

The computer unit 13 is configured using what is called a single board computer (hereinafter also referred to as "SBC"), for example, to realize the following functions by executing a predetermined program that is set in advance. That is, the computer unit 13 includes hardware resources for functioning as a computer and is configured to function as a position recognition unit 13a, a data acquisition unit 13b, a difference information extraction unit 13c, a guidance output unit 13d, a motion plan generation unit 13e, and a motion instruction unit 13f as a result of the predetermined program (software) being executed by the computer unit 13 and cooperating with the hardware resources.

The position recognition unit 13a is a function of recognizing position information regarding a position of work executed using the movable work tool 3 of the construction machine 2 in the work site area 1, based on a detection result obtained by the detection sensor unit 11 with respect to an external indicator 1a that is installed in the work site area 1 and a detection result obtained by the detection sensor unit 11 with respect to a movable indicator 3a that is attached to the movable work tool 3 included in the construction machine 2.

A leveling rod or an equivalent of the leveling rod that is installed at a reference point in the work site area 1 is used as the external indicator 1a, for example. A single external indicator 1a or two or more external indicators 1a may be installed in the work site area 1.

An image sensor (camera) that captures an image of the external indicator 1a is used as the detection sensor unit 11 that detects the external indicator 1a, for example. In this case, in terms of facilitating identification of the external indicator 1a, it is preferable that the external indicator 1a is provided with a two-dimensional marker figure that is identified based on an image pattern, a light emitting device including a two-dimensional light emitting surface that is identified based on a light emission pattern, or a light emitting device including a point light source that is identified based on a flashing pattern, which is an example of light emission patterns. However, a detection sensor unit 11 that is other than the image sensor may also be used so long as the external indicator 1a can be detected.

Also, assume that the movable indicator 3a is attached to the movable work tool 3 of the construction machine 2 in advance.

Similarly to the case of the external indicator 1a, detection regarding the movable work tool 3 is performed using an image sensor (camera) that captures an image regarding the movable work tool 3, for example. In this case, in terms of facilitating detection regarding the movable work tool 3 and identification of the movable indicator 3a, it is preferable that a two-dimensional marker figure of a pattern different from the external indicator 1a, a light emitting device including a two-dimensional light emitting surface of a pattern different from the external indicator 1a, or a light emitting device including a point light source of a flashing pattern different from the external indicator 1a is attached as the movable indicator 3a to the movable work tool 3. Also, similarly to the case of the external indicator 1a, detection of the movable indicator 3a may also be performed using a detection sensor unit 11 that is other than the image sensor.

The position recognition unit 13a recognizes at least the position of work executed using the movable work tool 3 of the construction machine 2 based on the detection result regarding the external indicator 1a and the detection result regarding the movable indicator 3a by using a surveying technique of which details will be described later, for example. Thus, a coordinate position in the work site area 1 (three-dimensional coordinate space) can be recognized for the position of work executed using the movable work tool 3.

Note that a configuration is also possible in which the position recognition unit 13a recognizes the attitude or orientation of the construction machine 2, in addition to the position of work, based on a detection result obtained by the detection sensor unit 11 such as an inclinometer or a gyroscope sensor. That is, position information that is recognized by the position recognition unit 13a includes at least information regarding the position of the construction machine 2, and preferably includes information regarding the attitude, orientation, or the like, in addition to the position.

The data acquisition unit 13b is a function of acquiring work plan data (design data) regarding the work site area 1. There is no particular limitation on the method for acquiring the work plan data, and the work plan data may be stored in a storage area of the computer unit 13 in advance or may be acquired from the outside via the information communication unit 12, for example.

The difference information extraction unit 13c is a function of acquiring a recognition result of the position recognition unit 13a as a monitoring result regarding a position of work executed using the movable work tool 3 of the construction machine 2, comparing the monitoring result with the work plan data acquired by the data acquisition unit 13b, and extracting a difference of the position of work executed using the movable work tool 3 relative to the work plan data, as difference information. There is no particular limitation on the method for extracting difference information, and the difference information can be extracted using a known computation method, for example.

The guidance output unit 13d is a function of generating operation guidance information regarding the movable work tool 3 based on the difference information extracted by the difference information extraction unit 13c, and outputting the generated operation guidance information. The operation guidance information is information for guiding an operation that needs to be performed in the construction machine 2 to make the position of work executed using the movable work tool 3 of the construction machine 2 match the work plan data. Such operation guidance information can be generated and output using a known technology that is known as machine guidance in the technical field of construction machines. Note that the operation guidance information is output to an operation panel that is operated by an operator of the construction machine 2 or an equivalent of the operation panel, for example, but there is no limitation to such a configuration, and the operation guidance information may also be output to the external management device 20 via the information communication unit 12.

The motion plan generation unit 13e is a function of generating motion plan information regarding the movable work tool 3 of the construction machine 2 based on the difference information extracted by the difference information extraction unit 13c. The motion plan information is information that specifies motions of the movable work tool 3 of the construction machine 2 to make the position of work executed using the movable work tool 3 match the work plan data. That is, the motion plan information is information that is necessary to realize automatic control of motions (automation of operation) of the construction machine 2. Note that automatic control referred to here can be realized using a known technology that is known as machine control in the technical field of construction machines.

The motion instruction unit 13f is a function of giving a motion instruction to a driving control unit 4 that is included in the construction machine 2 based on the motion plan information generated by the motion plan generation unit 13e. When a motion instruction is given by the motion instruction unit 13f, the driving control unit 4 of the construction machine 2 causes the movable work tool 3 to operate following the motion instruction. Note that the motion instruction to the construction machine 2 takes a part of the automatic control described above, and can be realized using a known technology that is known as machine control.

The above-described functions of the units 13a to 13f are realized as a result of the computer unit 13 executing the predetermined program. That is, the predetermined program for realizing the functions of the respective units (means) 13a to 13f corresponds to one embodiment of a "construction machine management program" according to the present invention. In this case, the predetermined program for realizing the functions may be provided in a state of being stored in a recording medium (e.g., a magnetic disk, an optical disk, a magneto-optical disk, or a semiconductor memory) from which the computer unit 13 can read the program or may be provided from the outside via a network such as the Internet or a dedicated line, so long as the program can be installed into the computer unit 13.

Note that a case where the computer unit 13 includes all of the functions of the units 13a to 13f is described here as an example, but there is no limitation to such a case, and the computer unit 13 is only required to include at least the function of the position recognition unit 13a. The functions of the units 13b to 13f other than the position recognition unit 13a may also be included in the external management device 20, rather than the computer unit 13, or may be included in both of the computer unit 13 and the external management device 20. A configuration is also possible in which both of the computer unit 13 and the external management device 20 do not include the functions of the units 13b to 13f.

Processing Operation Example

Next, processing operations in the construction machine management system configured as described above will be described. The processing operations described here correspond to a specific example of a construction machine management method.

When work is executed using the construction machine 2 in the work site area 1, detection regarding an external indicator 1a that is installed at a reference point in the work site area 1 is initially performed by the detection sensor unit 11 installed in the construction machine 2 at a position after movement of the construction machine 2. For example, in a case where an image sensor is used as the detection sensor unit 11, detection regarding the external indicator 1a is continuously performed until an image of the external indicator 1a is captured. If a plurality of external indicators 1a are installed, at least one external indicator 1a is detected.

Also, in addition to the detection of the external indicator 1a, the detection sensor unit 11 performs detection regarding the movable indicator 3a at the position after movement of the construction machine 2.

When the detection sensor unit 11 has detected the external indicator 1a and the movable indicator 3a, a position of work executed using the movable work tool 3 of the construction machine 2 is recognized based on the detection results using the surveying technique of which details will be described later, for example. Thus, the position recognition unit 13a recognizes a position (three-dimensional coordinate value) in the work site area 1 with respect to the position of work executed using the movable work tool 3. At this time, the position recognition unit 13a also recognizes the attitude or orientation of the movable work tool 3 as necessary.

With the recognition result obtained as described above, it is possible to specify an absolute position (including the attitude or orientation as necessary) of work executed using the movable work tool 3 of the construction machine 2, in the work site area 1 relative to the reference point. That is, the construction machine 2 can autonomously monitor the position of work executed by the construction machine 2 without using an external system such as TS or GNSS, by using the detection sensor unit 11 installed in the construction machine 2 and performing recognition processing in the position recognition unit 13a based on the detection results regarding the external indicator 1a and the movable indicator 3a.

When a monitoring result of the position of work executed using the movable work tool 3 of the construction machine 2 is acquired through the recognition processing performed by the position recognition unit 13a, the difference information extraction unit 13c compares the monitoring result with work plan data acquired by the data acquisition unit 13b and extracts difference information regarding a difference from the work plan data. When the difference information is extracted by the difference information extraction unit 13c, machine guidance processing operations or machine control processing operations can be performed as described below.

In a case where the machine guidance processing operations are performed, the guidance output unit 13d generates operation guidance information based on the difference information extracted by the difference information extraction unit 13c. The generated operation guidance information is output to the operation panel of the construction machine 2 or an equivalent of the operation panel, for example. As a result, the operator of the construction machine 2 can operate the construction machine 2 (i.e., self machine) while grasping the content of work according to the work plan data, the attitude, motions, and the like of the construction machine 2 by referring to contents output to the operation panel. This is very convenient for the operator in terms of making the position of work executed using the movable work tool 3 of the construction machine 2 match the work plan data. Note that the operation guidance information may also be output to the external management device 20 that is connected via the information communication unit 12. In this case, even if the operator who actually operates the construction machine 2 is not skilled, for example, a skilled person who refers to contents output to the external management device 20, which is disposed away from the construction machine 2, can give advice regarding operations to the unskilled operator while grasping conditions of work executed by the construction machine 2.

In a case where the machine control processing operations are performed, the motion plan generation unit 13e generates motion plan information based on the difference information extracted by the difference information extraction unit 13c so as to reduce the difference indicated by the difference information. Then, the motion instruction unit 13f gives a motion instruction to the driving control unit 4 of the construction machine 2 based on the motion plan information generated by the motion plan generation unit 13e. As a result, automated operation of the construction machine 2 (i.e., self machine) is performed with respect to motions, attitude, and the like such that the position of work executed using the movable work tool 3 matches the work plan data. Note that in the case where automated operation of the construction machine 2 is performed, the difference information extracted by the difference information extraction unit 13c, the motion plan information generated by the motion plan generation unit 13e, and the like may also be output to the external management device 20 connected via the information communication unit 12 to make it possible to assist in controlling motions, attitude, and the like of the construction machine 2 through the external management device 20. In this case, for example, a skilled person who operates the external management device 20 can correct contents of control performed on the construction machine 2 as appropriate while grasping conditions of work executed by the construction machine 2, and therefore accuracy, reliability, and the like of the automated operation of the construction machine 2 can be enhanced.

Operations and Effects

In the construction machine management system described above, a monitoring result regarding a position of work executed using the movable work tool 3 of the construction machine 2 is acquired using the detection sensor unit 11 installed in the construction machine 2 by combining detection results regarding the external indicator 1a and the movable indicator 3a and performing recognition processing in the position recognition unit 13a based on the detection results. Therefore, the position of work executed using the movable work tool 3 of the construction machine 2 can be autonomously monitored without using an external system such as TS or GNSS.

The autonomous monitoring using the detection sensor unit 11 can be easily introduced, when compared to cases where TS and GNSS, which are very expensive, are used. This is because popular products such as an image sensor (camera), an inclinometer, and the like can be used as the detection sensor unit 11. Furthermore, specialized knowledge that is required in the case of TS or GNSS is not needed, and therefore convenience is high. That is, the autonomous monitoring using the detection sensor unit 11 can be easily performed, when compared to a case where an external system such as TS or GNSS is used.

Also, the autonomous monitoring using the detection sensor unit 11 does not necessarily require laser beams or satellite radio waves from the outside, and therefore, even in a case where it is envisaged that the work site area 1 is set under various environments and conditions, the autonomous monitoring can be flexibly and appropriately applied to such a case. For example, even if the work site area 1 is set at a place such as an urban area where it is necessary to restrain from emitting laser beams or a place such as an underground space that satellite radio waves do not reach, it is possible to flexibly and appropriately monitor a position of work executed using the movable work tool 3 of the construction machine 2, and monitoring accuracy is not adversely affected.

Also, even if monitoring is autonomously performed using the detection sensor unit 11, the monitoring can be performed with a high accuracy on the order of several centimeters, depending on settings of the detection sensor unit 11, settings of the external indicator 1a and the like that are detection targets for the detection sensor unit 11, and settings of an algorithm of the recognition processing performed by the position recognition unit 13a. That is, with respect to the position of work executed using the movable work tool 3 of the construction machine 2, it is possible to recognize the position, attitude, and the like with high accuracy through the autonomous monitoring using the detection sensor unit 11.

As described above, according to the technical idea of the present embodiment, it is possible to autonomously monitor a position of work executed using the movable work tool 3 of the construction machine 2 by using the detection sensor unit 11 installed in the construction machine 2, and accordingly, the monitoring can be easily performed with high accuracy.

2. First Embodiment

Next, specific examples of embodiments of the above-described technical idea will be described.

First, a case where the construction machine 2 is a hydraulic excavator, which is a type of hydraulic shovels, will be described as a first embodiment.

Construction Machine

FIG. 2 is an illustrative diagram showing a schematic configuration example of a hydraulic excavator, which is an example of a construction machine that is used in a work site area in the first embodiment.

A hydraulic excavator 2, which is an example of the construction machine, is a type of construction machines called hydraulic shovels and includes a bucket (shovel) that is attached so as to face the operator, and is mainly used for excavation in the work site area 1. More specifically, the hydraulic excavator 2 includes a right endless track 2a and a left endless track 2b that function as a travel device, and is configured to be movable in the work site area 1. Also, the hydraulic excavator 2 includes a turnable machine base 2c that is supported by the travel device, and is configured to be operated (controlled) by the operator who rides on the machine base 2c.

A first arm 3b, a second arm 3c, and a bucket 3d that function as the movable work tool 3 are attached to the machine base 2c of the hydraulic excavator 2, and work such as excavation is performed on the ground surface by moving these arms and the bucket. That is, the position of a pointed end of the bucket 3d corresponds to a position of work executed using the bucket 3d.

Also, image sensors (cameras) 11a and 11b that capture images and an inclination sensor 11c that can detect inclination in two axial directions (more specifically, inclination in a left-right direction and a front-rear direction) are installed as the detection sensor unit 11 in the hydraulic excavator 2. The image sensors 11a and 11b are constituted by a plurality of (e.g., two) cameras 11a and 11b that are installed side by side so as to face the same direction at a place (e.g., a ceiling surface or a front surface of the machine base 2c) of the hydraulic excavator 2 where a good view can be obtained.

Furthermore, an inclination sensor 11d that can detect a direction (inclination) of the bucket 3d is attached to the movable work tool 3 of the hydraulic excavator 2.

Note that known cameras and known inclination sensors can be used as the cameras 11a and 11b and the inclination sensors 11c and 11d. Also, the hydraulic excavator 2 may also be provided with another detection sensor unit 11 in addition to the cameras and the inclination sensors.

A leveling rod that serves as the external indicator 1a or an equivalent of the leveling rod is installed so as to stand upright at a position (a position of which coordinates are specified in advance) that serves as a reference point in the work site area 1 in which the hydraulic excavator 2 is used. A two-dimensional marker FIG. 1b that is identified based on an image pattern is attached to the external indicator 1a. Note that, instead of the marker FIG. 1b, a light emitting device including a two-dimensional light emitting surface that is identified based on a light emission pattern or a light emitting device including a point light source that is identified based on a flashing pattern, which is an example of light emission patterns, may also be attached to the external indicator 1a. The marker FIG. 1b of the external indicator 1a is a target of image capturing by the cameras 11a and 11b.

In a case where a plurality of reference points are set in the work site area 1, an external indicator 1a and a marker FIG. 1b may also be arranged at each of the reference points. That is, an external indicator 1a and a marker FIG. 1b may also be individually installed at each of different positions in the work site area 1.

Also, a marker FIG. 3a that serves as a movable indicator is attached to a position near the bucket 3d in the second arm 3c, for example, in the movable work tool 3 of the hydraulic excavator 2. Note that a light emitting device including a two-dimensional light emitting surface that is identified based on a light emission pattern or a light emitting device including a point light source that is identified based on a flashing pattern, which is an example of light emission patterns, may also be attached instead of the marker FIG. 3a. Similarly to the marker FIG. 1b of the external indicator 1a, the marker FIG. 3a that serves as the movable indicator is a target of image capturing by the cameras 11a and 11b.

However, it is preferable that the marker FIG. 3a that serves as the movable indicator and the marker FIG. 1b of the external indicator 1a are respectively constituted by different two-dimensional patterns. Note that, in the case of light emitting devices, it is preferable that light emission patterns or flashing patterns of the respective light emitting devices differ from each other.

FIG. 3 is an illustrative diagram showing examples of two-dimensional patterns of marker figures that are used in the construction machine management system according to the present embodiment.

If the two-dimensional pattern shown in FIG. 3(a) is used as the marker FIG. 1b, for example, it is conceivable to use the two-dimensional pattern shown in FIG. 3(b) as the marker FIG. 3a. In this case, each marker figure can be easily and correctly identified eve if the marker FIGS. 1b and 3a are detected using the same image sensors (cameras) 11a and 11b.

System Configuration Example

Next, a configuration example of the construction machine management system according to the first embodiment will be described.

Figure 4:
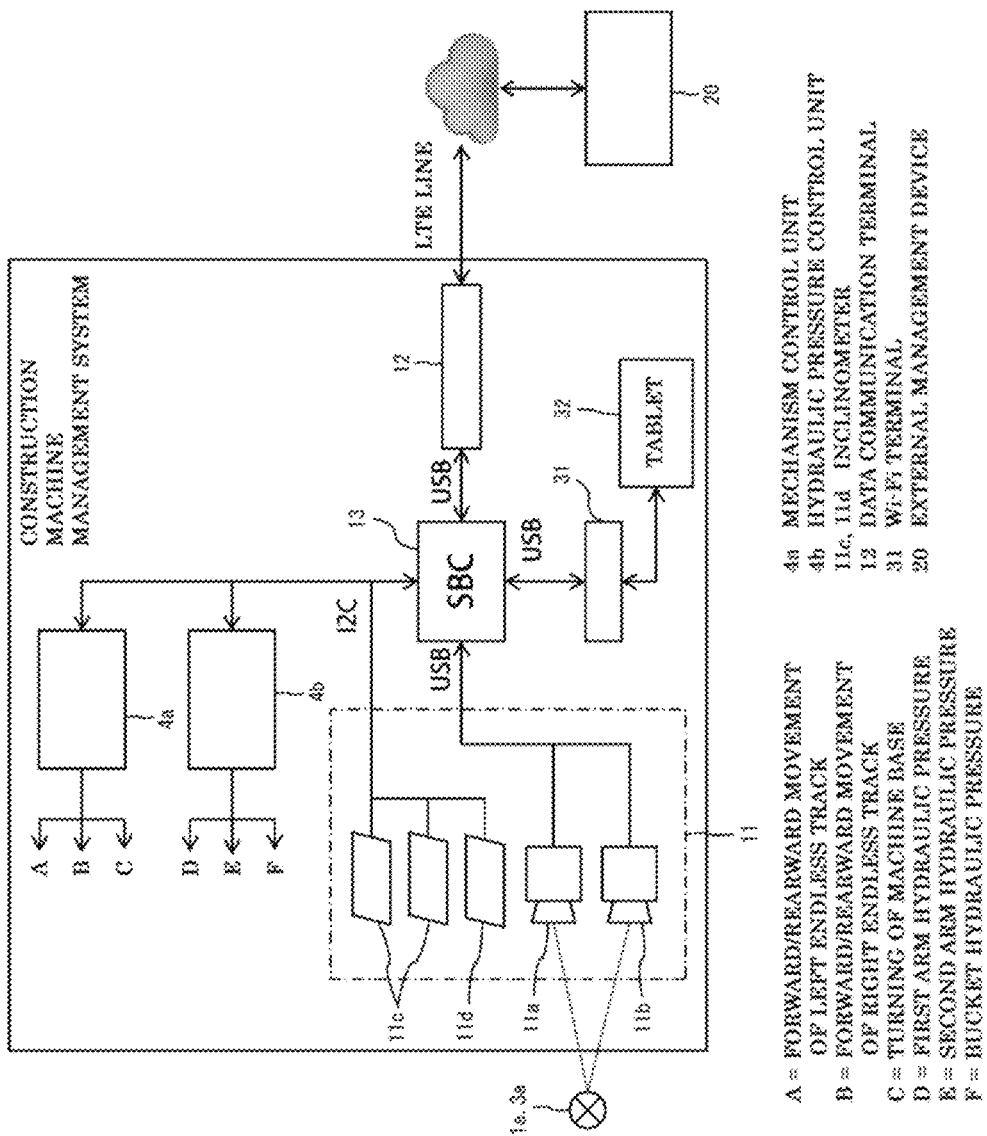
FIG. 4 is a block diagram showing a configuration example of the construction machine management system according to the first embodiment of the present invention.

FIG. 4 is a block diagram showing the configuration example of the construction machine management system according to the first embodiment.

The construction machine management system according to the first embodiment includes the cameras 11a and 11b and the inclination sensors 11c and 11d, which function as the detection sensor unit 11 installed in the hydraulic excavator 2, and an SBC 13 that is connected to the cameras and the inclination sensors. The SBC 13 functions as the computer unit 13 described above.

The external management device 20 is connected to the SBC 13 via a data communication terminal 12 that functions as the information communication unit 12. Also, a tablet terminal 32 is connected to the SBC 13 via a Wi-Fi terminal 31. The tablet terminal 32 is used by the operator of the hydraulic excavator 2 and corresponds to an equivalent of an operation panel of the hydraulic excavator 2. Note that the tablet terminal 32 may also be omitted if the operation panel of the hydraulic excavator 2 includes a function of displaying images.

Furthermore, a mechanism control unit 4a and a hydraulic pressure control unit 4b, which function as the driving control unit 4 included in the hydraulic excavator 2, are connected to the SBC 13. The mechanism control unit 4a controls forward and backward movements of the right endless track 2a and the left endless track 2b, turning of the machine base 2c, and the like. The hydraulic pressure control unit 4b controls motions of the first arm 3b, the second arm 3c, and the bucket 3d, which constitute the movable work tool 3.

Note that it is conceivable to use a USB (Universal Serial Bus) or an I2C (Inter-Integrated Circuit) for connection between the SBC 13 and the outside, but there is no limitation to such a configuration, and another known communication method may also be used.

Processing Operation Example

Next, an example of processing operations in the construction machine management system configured as described above, that is, a construction machine management method according to the first embodiment will be described.

Figure 5:
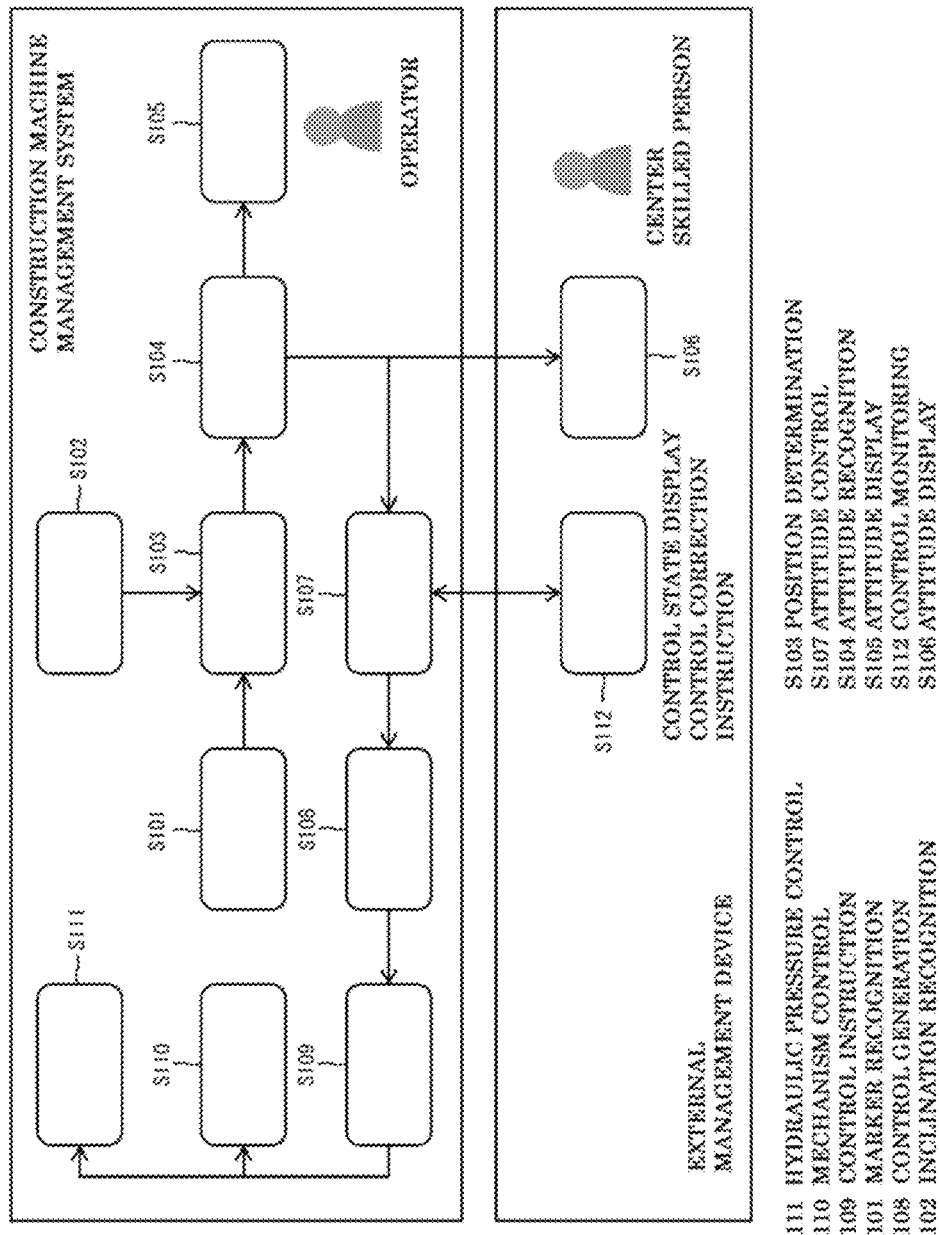
FIG. 5 is a flow diagram showing an example flow of a processing procedure of a construction machine management method according to the first embodiment of the present invention.

FIG. 5 is a flow diagram showing an example flow of a processing procedure of the construction machine management method according to the first embodiment.

In the construction machine management system configured as described above, marker recognition is initially performed with respect to the external indicator 1a installed at the reference point in the work site area 1 (step 101, hereinafter, step will be abbreviated as "S"), in monitoring a position of work executed by the hydraulic excavator 2. More specifically, images of the marker FIG. 1b attached to the external indicator 1a are captured by the cameras 11a and 11b to obtain captured images of the marker FIG. 1b. At this time, the images are captured using the plurality of (e.g., two) cameras 11a and 11b, and therefore, if images of any one marker FIG. 1b that is arranged in the work site area 1 are captured, it is possible to perform position recognition using the surveying technique described later. If a plurality of marker FIG. 1b are arranged in the work site area 1, even if there is an obstruction between a marker FIG. 1b and the hydraulic excavator 2, it is possible to obtain captured images of another marker FIG. 1b, and therefore marker recognition regarding the external indicator 1a is not hindered. Marker recognition is performed with respect to not only the marker FIG. 1b of the external indicator 1a but also the marker FIG. 3a that serves as the movable indicator attached to the movable work tool 3 of the hydraulic excavator 2 (S101). More specifically, images of the marker FIG. 3a attached to the movable work tool 3 are captured by the cameras 11a and 11b to obtain captured images of the marker FIG. 3a. At this time, the images of the marker FIGS. 1b and 3a are captured using the same cameras 11a and 11b, and therefore the configuration of the detection sensor unit 11 can be kept from becoming complex.

Furthermore, in the construction machine management system, the inclination sensor 11c performs inclination recognition regarding the hydraulic excavator 2 and the inclination sensor 11d performs inclination recognition regarding the bucket 3d of the movable work tool 3 (S102).

After marker recognition and inclination recognition are performed, in the construction machine management system, the function of the position recognition unit 13a in the SBC 13 performs position determination (position recognition) with respect to a position of work executed using the bucket 3d of the hydraulic excavator 2 (S103).

In the position determination, the position recognition unit 13a performs first recognition processing and second recognition processing. First, in the first recognition processing, information regarding the position of the hydraulic excavator 2 in the work site area 1 is recognized based on image capturing results regarding the marker FIG. 1b of the external indicator 1a. More specifically, a positional relationship between the marker FIG. 1b and the cameras 11a and 11b is recognized based on an image capturing result obtained using the camera 11a, an image capturing result obtained using the other camera 11b, and a positional relationship between the cameras 11a and 11b, using the following surveying technique using two camera images.

Figure 6:
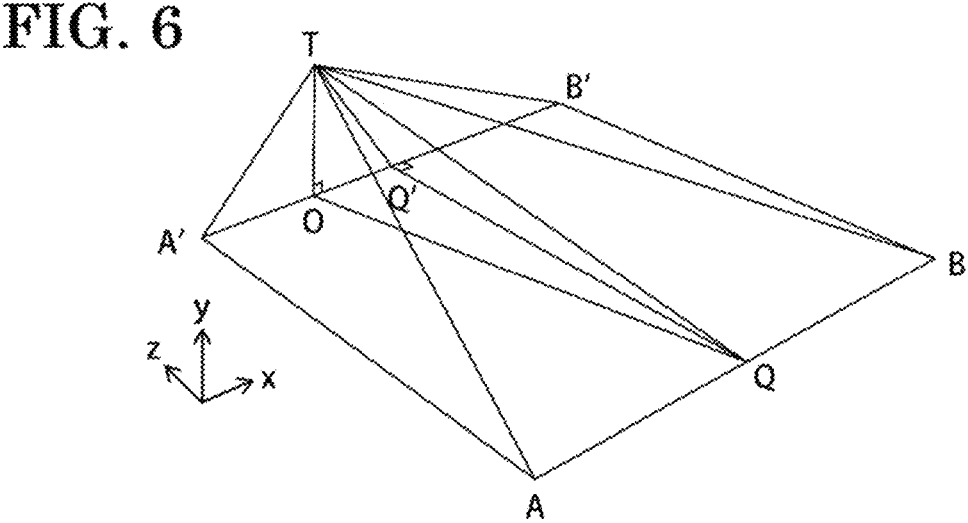
FIG. 6 is an illustrative diagram showing an outline of a surveying technique using two camera images, which is used in the first embodiment of the present invention.

FIG. 6 is an illustrative diagram showing an outline of the surveying technique using two camera images, which is used in the first embodiment.

In FIG. 6, A and B respectively represent positions of the cameras 11a and 11b, T represents a position of a survey target (e.g., the marker FIG. 1b), AA' and BB' respectively represent optical axes of the cameras 11a and 11b. Also, Q represents the middle point of AB, and Q' represents the middle point of AB'. Accordingly, the following relationships hold true: AQ=BQ, A'Q'=B'Q', AA'//QQ'//BB'. Note that points A', O, Q', and B' are imaginary points on a plane that is perpendicular to QQ', and A and B' respectively correspond to center points (origins) of images captured by the cameras 11a and 11b.

Here, a case will be considered in which an actual distance between points I and J is denoted by IJ, a pixel distance between the points I and J in an image is denoted by IJp, and a characteristic value of the cameras 11a and 11b that can be measured in advance to determine a distance to a subject from a size of the subject and a pixel distance of the subject is denoted by k. In this case, the following relational expressions hold true.

$$OT_P = y_T \qquad \text{[Math. 1]}$$
$$A'O_P = x_T^A (A \text{ cordinate system})$$
$$OB'_P = x_T^B (B \text{ cordinate system})$$
$$A'B'_P = x_T^A - x_T^B$$
$$A'O = AB \times \frac{A'O_P}{A'B'_P}$$
$$OB' = AB \times \frac{OB'_P}{A'B'_P}$$
$$OT = AB \times \frac{OT_P}{A'B'_P}$$
$$Q'O = \frac{A'O - OB'}{2}$$
$$QQ' = AA' = \frac{A'O}{A'O_P}k$$

-continued
$$QO = \sqrt{Q'O^2 + QQ'^2}$$
$$QT = \sqrt{Q'O^2 + OT^2}$$

Based on the above relational expressions, a distance QT to the survey target, a distance QO to the survey target on an optical axis plane, and a distance OT from the optical axis plane to the survey target can be determined based on a positional relationship between A and B regarding the cameras 11a and 11b and positional relationships between points A', O, Q', and B' in images captured by the cameras 11a and 11b. Also, a distance and an elevation angle from the point T to the point Q can be determined based on a detection result obtained by the inclination sensor 11c regarding an elevation angle of a line segment QO from a horizontal plane. Also, if distances and elevation angles to two marker FIG. 1b are measured, absolute coordinates of the point Q can be determined.

That is, the position recognition unit 13a calculates and recognizes a three-dimensional coordinate position of a predetermined portion of the hydraulic excavator 2 (e.g., the middle point Q between installation points of the cameras 11a and 11b) that serves as a reference point when specifying the position of the hydraulic excavator 2, relative to the marker FIG. 1b (i.e., a reference point in the work site area 1), using the above-described surveying technique using two camera images. The thus-recognized three-dimensional coordinate position corresponds to an absolute position of the predetermined portion of the hydraulic excavator 2 in the work site area 1.

At this time, the position recognition unit 13a can recognize the orientation of the hydraulic excavator 2 (i.e., a direction that the machine base 2c faces) in the work site area 1 by specifying the position of the reference point at which the external indicator 1a is installed, based on the image capturing results regarding the marker FIG. 1b. Furthermore, the position recognition unit 13a can recognize the attitude of the hydraulic excavator 2 (i.e., a state of inclination in the work site area 1) based on the detection result obtained by the inclination sensor 11c.

In the position determination, after performing the first recognition processing described above, the position recognition unit 13a subsequently performs the second recognition processing. In the second recognition processing, position information regarding a position of work executed using the bucket 3d is recognized based on image capturing results regarding the marker FIG. 3a that serves as the movable indicator. More specifically, a positional relationship between the marker FIG. 3a and the cameras 11a and 11b is recognized and then a positional relationship between the marker FIG. 3a and the position of work executed using the bucket 3d is recognized based on an image capturing result obtained using the camera 11a, an image capturing result obtained using the other camera 11b, a positional relationship between the marker FIG. 3a and the bucket 3d, and a detection result obtained by the inclination sensor 11d with respect to the bucket 3d, using the above-described surveying technique using two camera images.

Figure 7:
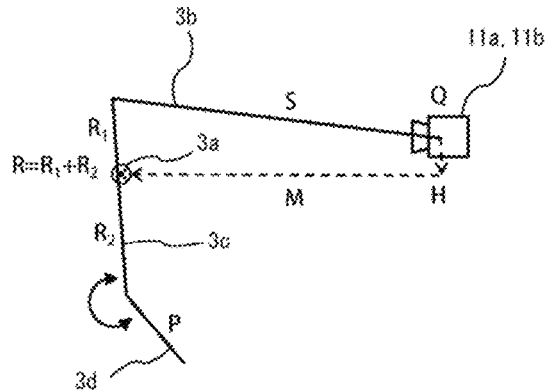
FIG. 7 is an illustrative diagram showing an outline of a position recognition model for a position of work executed using a bucket, which is used in the first embodiment of the present invention.

FIG. 7 is an illustrative diagram showing an outline of a position recognition model for the position of work executed using the bucket, which is used in the first embodiment.

In FIG. 7, S represents a size of the first arm 3b, R represents a size of the second arm 3c, P represents a size of the bucket 3d, and $R_1$ and $R_2$ represent a position of the marker FIG. 3a in the second arm 3c, and these values are already known when the hydraulic excavator 2 is used. Accordingly, if a horizontal distance M and a vertical distance H from the point Q on the AB optical axis plane of the cameras 11a and 11b to the marker FIG. 3a are recognized using the above-described surveying technique using two camera images and a rotation angle (inclination) of the bucket 3d is found based on a detection result obtained by the inclination sensor 11d, it is possible to calculate and recognize a three-dimensional coordinate position of the pointed end of the bucket 3d relative to the point Q (i.e., the predetermined portion of the hydraulic excavator 2 that serves as a reference point when specifying the position of the hydraulic excavator 2). The position of the pointed end of the bucket 3d corresponds to the position of work executed using the bucket 3d. That is, the thus-recognized three-dimensional coordinate position corresponds to a relative position of work executed using the bucket 3d relative to the predetermined portion of the hydraulic excavator 2.

At this time, the position recognition unit 13a also recognizes the attitude or orientation of the movable work tool 3 by reflecting a recognition result of the attitude or the like of the hydraulic excavator 2, which is obtained in the first recognition processing. Thus, the position recognition unit 13a can correctly recognize the position of the pointed end of the bucket 3d of the hydraulic excavator 2 even if the hydraulic excavator 2 is inclined, for example.

The position recognition unit 13a can obtain a monitoring result of an absolute position in the work site area 1 relative to the reference point, with respect to the position of work executed using the bucket 3d of the hydraulic excavator 2 by combining the recognition result of the absolute position obtained in the first recognition processing and the recognition result of the relative position obtained in the second recognition processing.

Thereafter, in the construction machine management system, the function of the difference information extraction unit 13c in the SBC 13 recognizes the attitude of the hydraulic excavator 2 relative to work plan data of the work site area 1 (S104) as shown in FIG. 5. More specifically, the monitoring result regarding the position of work executed using the bucket 3d of the hydraulic excavator 2 is compared with coordinate values of a corresponding position in the work plan data of the work site area 1, and difference information regarding a difference between the monitoring result and the coordinate values is extracted.

After the difference information is extracted, in the construction machine management system, the function of the guidance output unit 13d in the SBC 13 performs machine guidance processing operations and outputs operation guidance information to display the attitude of the hydraulic excavator 2 to the operator of the hydraulic excavator 2 (S105). At this time, the operation guidance information may also be output to the external management device 20. That is, the attitude of the hydraulic excavator 2 may also be displayed to a center skilled person who handles the external management device 20 (S106).

The operation guidance information is output in the following manners, for example.

FIG. 8 is an illustrative diagram showing examples of the operation guidance information output by the construction machine management system according to the first embodiment.

It is conceivable to output the operation guidance information using a display screen 41 shown in FIG. 8(a), for example. In the display screen 41 of the illustrated example, an image 41b that represents the bucket 3d of the hydraulic excavator 2 is displayed at a position that reflects the extracted difference information relative to a work execution surface 41a of which a three-dimensional shape is drawn in a wire frame style based on the work plan data. A guide line (guidance curve) 41c for guiding the current position of the bucket 3d to the work execution surface 41a may also be displayed in the display screen 41. Furthermore, related numerical values (e.g., coordinate values) may also be displayed in the display screen 41.

The operation guidance information does not necessarily have to be output using the display screen 41 of three-dimensional display, and may also be output using a display screen 42 of two-dimensional display as shown in FIG. 8(b), for example, and a configuration is also possible in which three-dimensional display and two-dimensional display can be switched as necessary.

Outputting the operation guidance information using these display screens 41 and 42 is very convenient for the operator in terms of making the position of work executed using the bucket 3d of the hydraulic excavator 2 match the work plan data. Also, if the operation guidance information is output to the external management device 20, even if the operator who actually operates the hydraulic excavator 2 is not skilled, for example, the center skilled person who is at a remote place can give advice regarding operations to the unskilled operator while grasping conditions of work executed by the hydraulic excavator 2.

Also, in the construction machine management system, the functions of the motion plan generation unit 13e and the motion instruction unit 13f in the SBC 13 may perform machine control processing operations separately from or in addition to the machine guidance processing operations described above. More specifically, as shown in FIG. 5, first, the motion plan generation unit 13e performs processing (i.e., attitude control in FIG. 5) for generating a movement curve for moving the bucket 3d to the work execution surface, as motion plan information (S107), and performs processing (i.e., control generation in FIG. 5) for constituting motions for realizing the movement by sequences of hydraulic operations of the first arm 3b, the second arm 3c, and the bucket 3d, forward or rearward movement of the right endless track 2a or the left endless track 2b, and turning of the machine base 2c (S108). Then, the motion instruction unit 13f performs processing (i.e., control instruction in FIG. 5) for giving motion instructions according to the sequences to the mechanism control unit 4a and the hydraulic pressure control unit 4b (S109). Upon receiving the motion instructions, the mechanism control unit 4a causes the right endless track 2a, the left endless track 2b, or the machine base 2c to operate as necessary (S110), and the hydraulic pressure control unit 4b causes the first arm 3b, the second arm 3c, or the bucket 3d to operate as necessary (S111) to guide the bucket 3d of the hydraulic excavator 2 to a predetermined position.

Through the machine control processing operations described above, the position of the hydraulic excavator 2 can be automatically adjusted such that the bucket 3d moves along the work execution surface. That is, automated operation of the hydraulic excavator 2 is performed with respect to motions, attitude, and the like such that the position of work executed using the bucket 3d matches the work plan data.

Note that, in the case where the machine control processing operations are performed, attitude control (S107), control generation (S108), and control instruction (S109) are performed by the SBC 13 in this example, but these types of processing may also be performed by the external management device 20, which has higher processing capability when compared to the SBC 13.

A configuration is also possible in which the motion plan information (movement curve, etc.) generated in the attitude control (S107) is output to the external management device 20 to be used in the external management device 20 to monitor control (S112). This configuration makes it possible to assist in controlling motions, attitude, and the like of the hydraulic excavator 2 through the external management device 20, for example. Accordingly, the center skilled person who is at a remote place can correct contents of control performed on the hydraulic excavator 2 as appropriate while grasping conditions of work executed by the hydraulic excavator 2, and therefore accuracy, reliability, and the like of the automated operation of the hydraulic excavator 2 can be enhanced.

Operations and Effects

According to the first embodiment described above, it is possible to autonomously monitor a position of work executed using the bucket 3d of the hydraulic excavator 2 by using the detection sensor unit 11 installed in the hydraulic excavator 2, and therefore the monitoring can be easily performed with high accuracy.

Also, according to the first embodiment, a monitoring result regarding the position of work executed using the bucket 3d is compared with the work plan data of the work site area 1 and a difference between the monitoring result and the work plan data is extracted as difference information. Accordingly, the machine guidance processing operations or the machine control processing operations can be performed based on the extracted difference information, and this is very favorable in terms of effectively utilizing the monitoring result autonomously obtained by the hydraulic excavator 2.

Also, if the machine guidance processing operations or the machine control processing operations are performed based on the result of autonomous monitoring as described in the first embodiment, convenience is very high for the operator of the hydraulic excavator 2. Furthermore, reliability and the like of these processing operations can be assured because the processing operations are performed based on the result of autonomous monitoring (i.e., a monitoring result that is obtained easily with high accuracy).

Also, if the difference information or the motion plan information or the like that is derived from the difference information is given to the external management device 20 as described in the first embodiment, the center skilled person who is at a remote place can give advice or assist in control, for example. This is very convenient for the operator and the center skilled person, and leads to very high accuracy, efficiency, reliability, and the like of work executed by the hydraulic excavator 2.

Also, in the first embodiment, the image sensors (cameras) 11a and 11b are installed as the detection sensor unit 11 in the hydraulic excavator 2, and an absolute position of the hydraulic excavator 2 and a relative position of the bucket 3d are recognized by performing recognition processing with respect to images obtained using the image sensors 11a and 11b. If position recognition is performed using the cameras 11a and 11b as described above, the system can be easily introduced when compared to cases where very expensive TS and GNSS are used. Also, specialized knowledge required in the cases of TS and GNSS is not needed, and therefore convenience is high, and the system can be easily established. Furthermore, since position recognition is performed by analyzing images obtained using the cameras 11a and 11b, a position can be recognized with necessary and sufficient positional accuracy (e.g., a high accuracy on the order of several centimeters) depending on settings of an analysis algorithm.

Also, in the first embodiment, the same image sensors (cameras) 11a and 11b installed in the hydraulic excavator 2 are used in detection regarding the marker FIG. 1b of the external indicator 1a and detection regarding the marker FIG. 3a that serves as the movable indicator in the second arm 3c. Accordingly, even if it is necessary to detect the marker FIG. 1b and the marker FIG. 3a to recognize an absolute position of the hydraulic excavator 2 and a relative position of the bucket 3d, image sensors (cameras) corresponding to the respective marker figures need not be individually provided, and a sensor configuration can be kept from becoming complex. This leads to suppression of a sensor introduction cost and a reduction in a processing load of image processing, and accordingly is preferable in terms of making it possible to easily establish the system.

Also, in the first embodiment, the image sensors are constituted by the plurality of (e.g., two) cameras 11a and 11b that are installed side by side so as to face the same direction. That is, a plurality of (e.g., two) captured images are obtained as detection results regarding the single marker FIG. 1b or 3a. Accordingly, the surveying technique using two camera images can be used, for example, and position recognition can be performed with high accuracy even if the detection target is the single marker FIG. 1b or 3a.

Also, in the first embodiment, the marker FIG. 1b (or a light emitting device) with a two-dimensional pattern is attached to the external indicator 1a. Accordingly, in the case where the image sensors (cameras) 11a and 11b are used in detection regarding the external indicator 1a, a pattern recognition technology can be used and the marker FIG. 1b included in captured images can be easily and correctly identified and extracted.

Furthermore, in the first embodiment, the marker FIG. 3a (or a light emitting device) that serves as the movable indicator is attached to the second arm 3c of the hydraulic excavator 2, and accordingly, the marker FIG. 3a can be easily and correctly identified and extracted similarly to the case of the marker FIG. 1b of the external indicator 1a. Furthermore, if the marker FIG. 3a has a pattern different from that of the marker FIG. 1b, the marker FIGS. 1b and 3a are not confused.

3. Second Embodiment

Next, a case where the construction machine 2 is a slip forming machine that is used in a slip-form construction method will be described as a second embodiment. Note that differences from the first embodiment will be mainly described here, and descriptions of contents that are similar to the case of the first embodiment will be omitted.

Construction Machine

Figure 9:
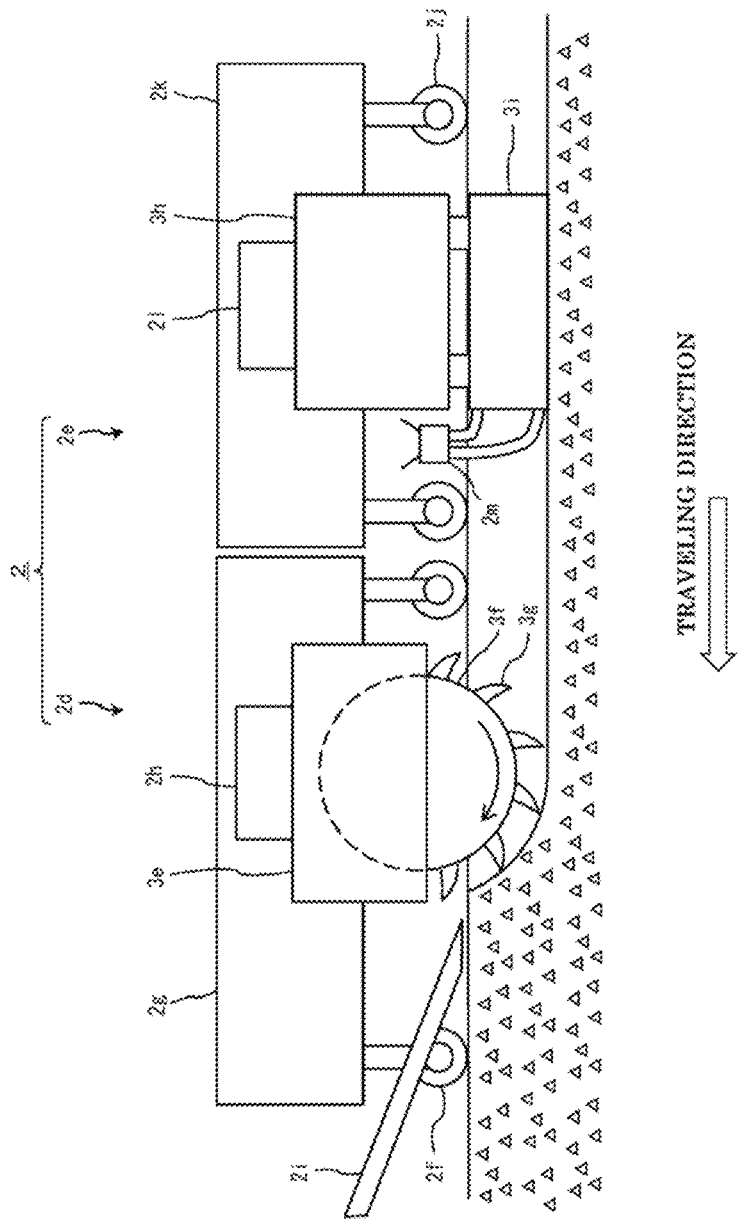
FIG. 9 is a side view schematically showing a basic configuration example of a slip forming machine, which is an example of a construction machine that is used in a work site area in a second embodiment of the present invention.

FIG. 9 is a side view schematically showing a basic configuration example of a slip forming machine, which is an example of a construction machine that is used in a work site area in the second embodiment.

A slip forming machine 2, which is an example of the construction machine, includes at least a front-side cutting machine (hereinafter also simply referred to as a "cutting machine") 2d that is arranged on the front side of a traveling direction and a rear-side molding machine (hereinafter also simply referred to as a "molding machine") 2e that is arranged on the rear side of the traveling direction. The cutting machine 2d and the molding machine 2e are coupled to each other and are configured to move together, but may also be configured to move as separate machines.

Here, the slip-form construction method performed using the slip forming machine 2 will be briefly described.

Figure 10:
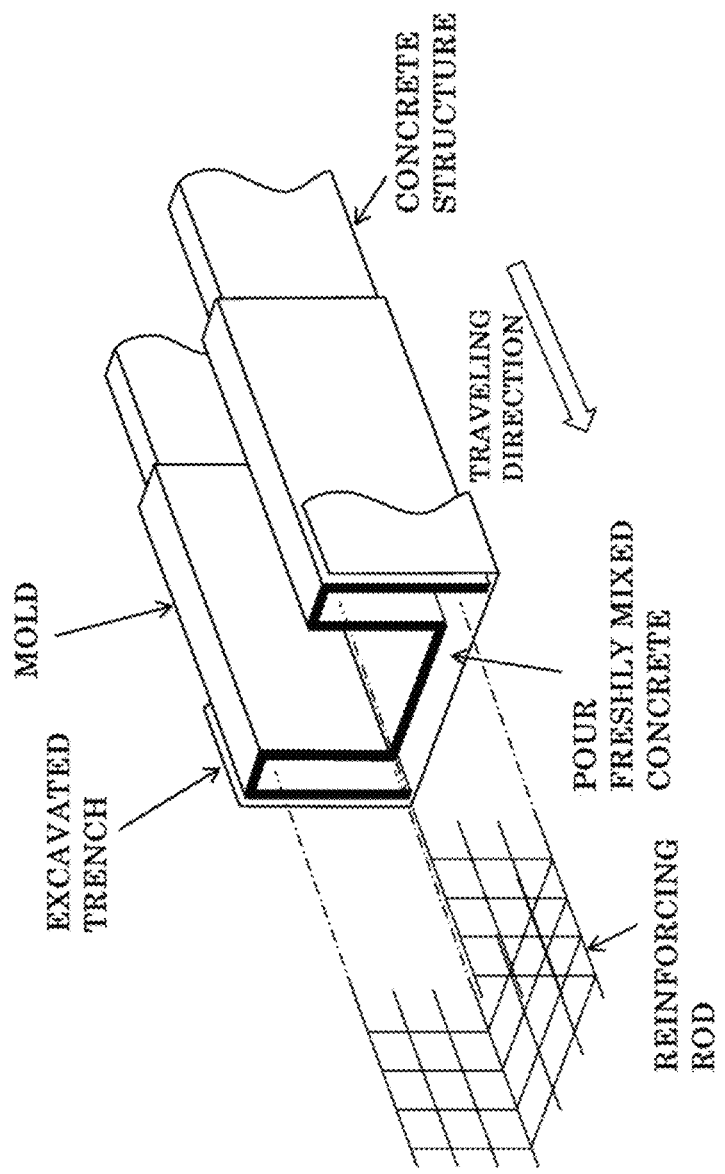
FIG. 10 is an illustrative diagram showing execution conditions of a slip-form construction method that is performed using the slip forming machine in the second embodiment of the present invention.

FIG. 10 is an illustrative diagram showing execution conditions of the slip-form construction method performed using the slip forming machine.

In execution of work using the slip-form construction method, first, an excavation step is performed using the cutting machine 2d to dig a trench. After the excavated trench is formed, a steel mold included in the molding machine 2e is placed into the excavated trench. Then, a molding step is performed by pouring freshly mixed concrete into the mold and compacting the concrete into a predetermined shape within the mold. These steps are performed while moving the cutting machine 2d and the molding machine 2e.

As described above, in the slip-form construction method, a concrete structure (e.g., a U-shaped trench) that has the same cross section is continuously formed using the slip forming machine that includes a self-propelling function.

Note that reinforcing rods may also be laid inside the concrete construction. In this case, the reinforcing rods can be laid between the cutting machine 2d and the molding machine 2e that are spaced from each other.

In order to execute work using the slip-form construction method described above, the cutting machine 2d and the molding machine 2e of the slip forming machine 2 are configured as described below.

Figure 11:
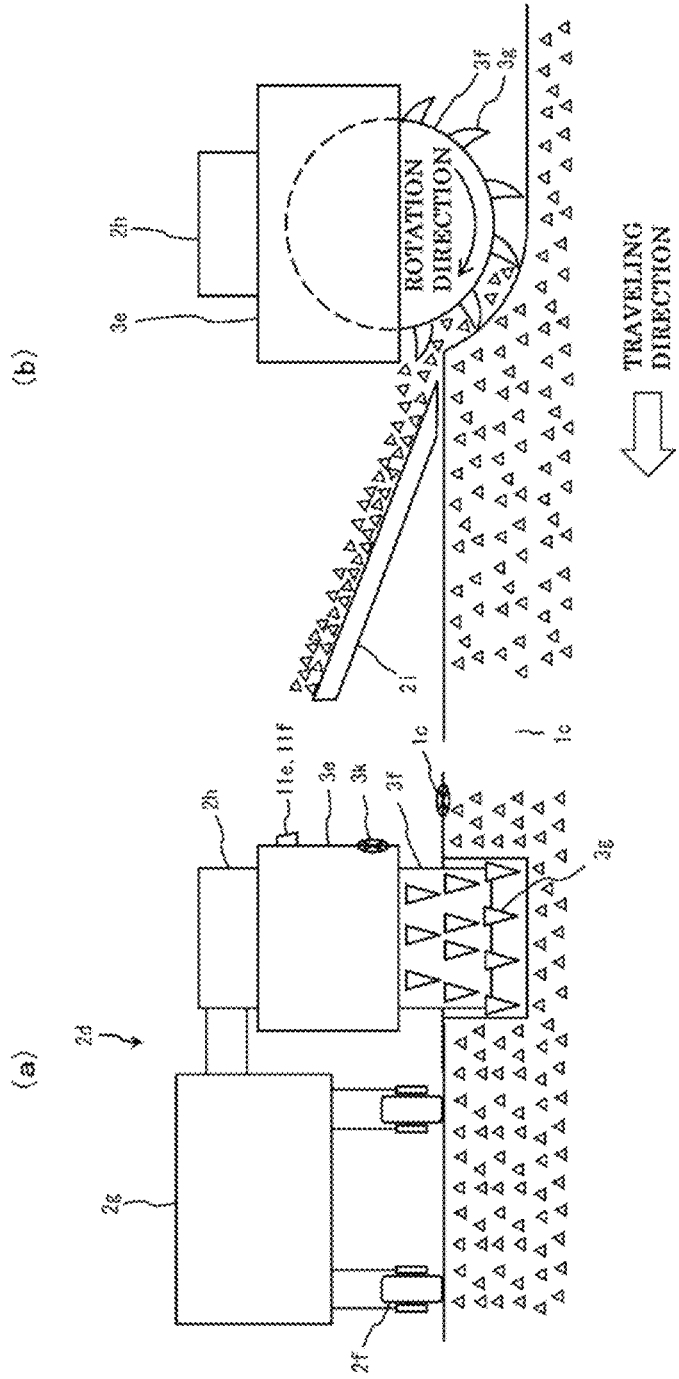
FIG. 11 is an illustrative diagram schematically showing a configuration example of a front-side cutting machine that constitutes the slip forming machine in the second embodiment of the present invention.

FIG. 11 is an illustrative diagram schematically showing a configuration example of the front-side cutting machine that constitutes the slip forming machine in the second embodiment.

As shown in FIG. 11(a), the cutting machine 2d includes a travel device 2f such as an endless track (crawler) or a tire and a vehicle body portion 2g that is supported by the travel device 2f, and is configured to be movable in the work site area. An upper housing 3e and an excavation drum 3f that function as the movable work tool 3 are attached to the vehicle body portion 2g via an actuator 2h that is operated using hydraulic pressure. The excavation drum 3f is rotatably supported by the upper housing 3e, and a plurality of cutter bits 3g are provided on an outer peripheral surface of the excavation drum 3f.

In the cutting machine 2d configured as described above, the actuator 2h moves the upper housing 3e to control the position and attitude of the excavation drum 3f. Also, work such as excavation is executed on the ground surface by rotating the excavation drum 3f as shown in FIG. 11(b). Note that excavated matter (soil, sand, stone, pieces of asphalt, etc.) generated as a result of the excavation drum 3f rotating is conveyed by a conveyor 2i that extends forward.

That is, in the cutting machine 2d, the upper housing 3e, the excavation drum 3f, and the cutter bits 3g, which can move when the cutting machine travels, correspond to the movable work tool 3 of the construction machine 2. Also, a tip end position of each cutter bit 3g provided on the outer peripheral surface of the excavation drum 3f that rotates corresponds to a position of work executed using the movable work tool 3.

Figure 12:
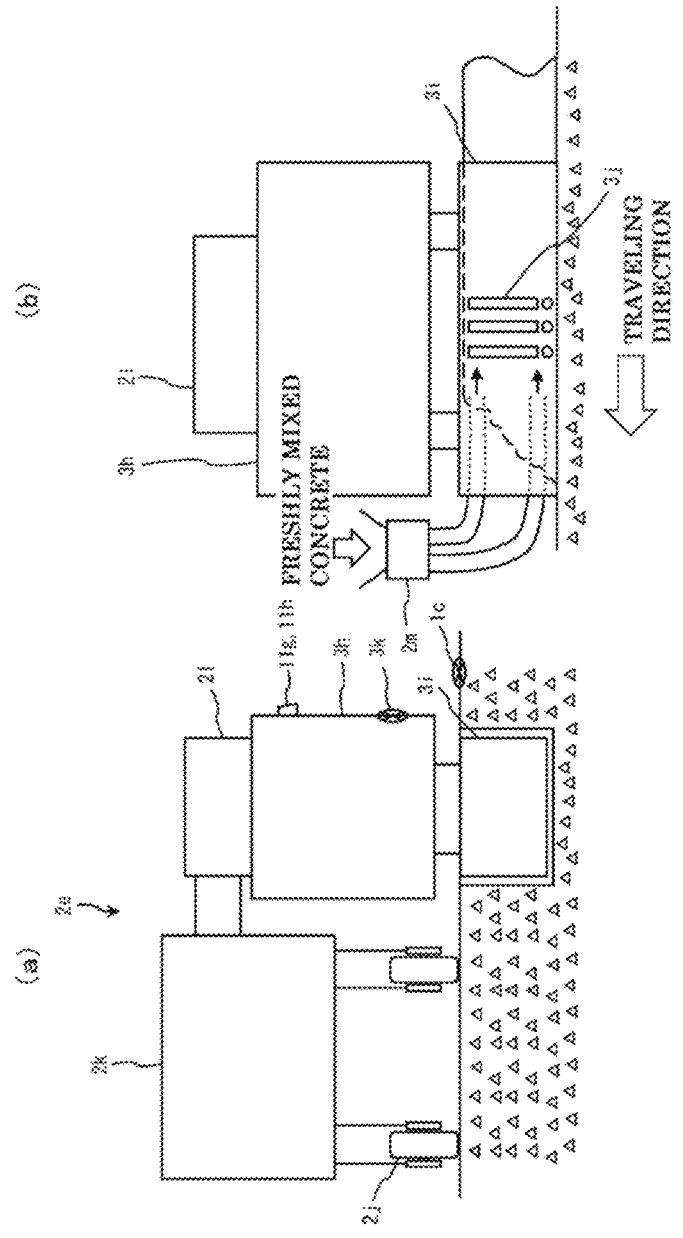
FIG. 12 is an illustrative diagram schematically showing a configuration example of a rear-side molding machine that constitutes the slip forming machine in the second embodiment of the present invention.

FIG. 12 is an illustrative diagram schematically showing a configuration example of the rear-side molding machine that constitutes the slip forming machine in the second embodiment.

As shown in FIG. 12(a), the molding machine 2e includes a travel device 2j and a vehicle body portion 2k that is supported by the travel device 2j, and is configured to be movable in the work site area, similarly to the cutting machine 2*d* described above. An upper housing 3*h* and a mold 3*i* that function as the movable work tool 3 are attached to the vehicle body portion 2*k* via an actuator 2*l* that is operated using hydraulic pressure.

A concrete pouring device 2*m* for pouring freshly mixed concrete into the mold 3*i* is connected to the mold 3*i* as shown in FIG. 12(*b*). Furthermore, a vibrator 3*j* for filling the mold 3*i* with the freshly mixed concrete using vibration is attached to the mold 3*i*.

In the molding machine 2*e* configured as described above, the actuator 2*l* moves the upper housing 3*h* to control the position and attitude of the mold 3*i*. Also, a concrete structure that has the same cross section is continuously formed by moving the mold 3*i*, of which the position and attitude are controlled, in the travelling direction while pouring concrete into the mold 3*i*.

That is, in the molding machine 2*e*, the upper housing 3*h* and the mold 3*i*, which can move when the molding machine travels, correspond to the movable work tool 3 of the construction machine 2. Also, a position at which the mold 3*i* is arranged corresponds to a position of work executed using the movable work tool 3.

Incidentally, in the second embodiment described here, the detection sensor unit 11 is installed in the slip forming machine 2.

Figure 13:
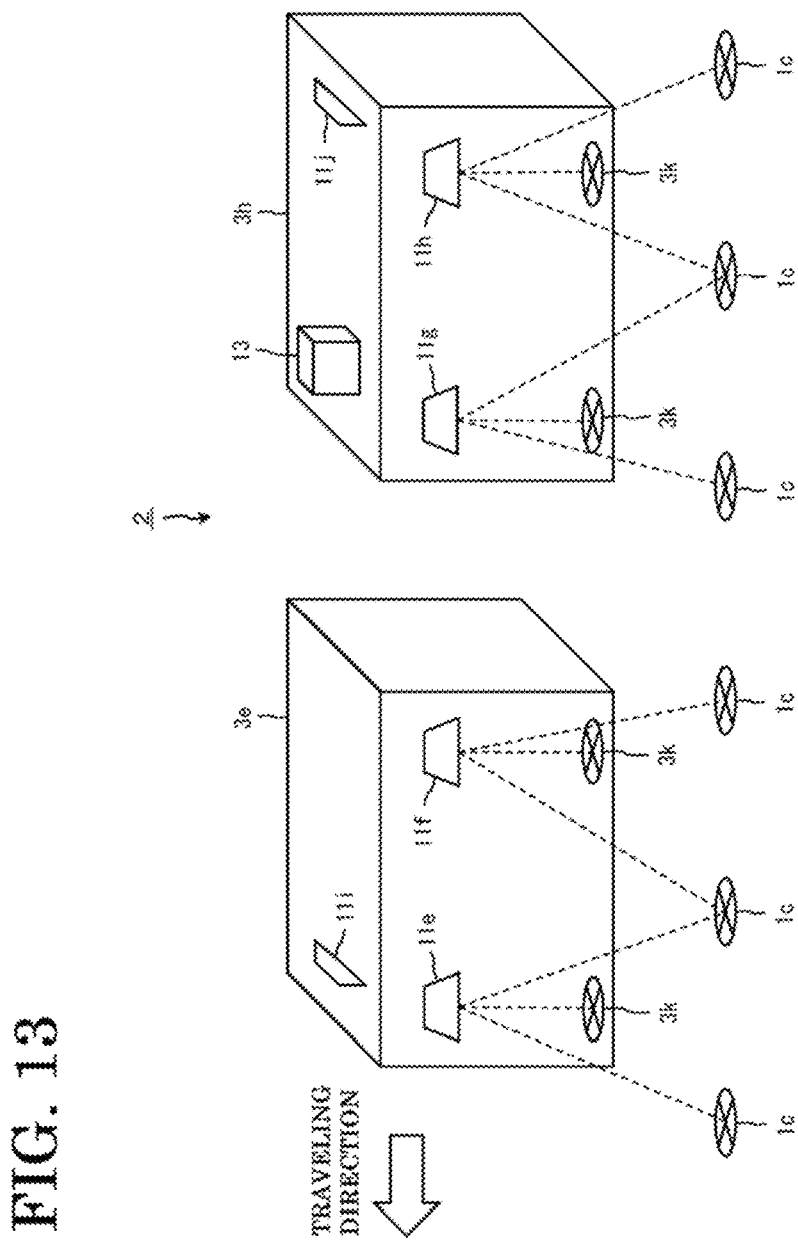
FIG. 13 is a perspective view showing a schematic configuration example of the slip forming machine, which is an example of the construction machine used in the work site area in the second embodiment of the present invention.

FIG. 13 is a perspective view showing a schematic configuration example of the slip forming machine, which is an example of the construction machine used in the work site area in the second embodiment.

Image sensors (cameras) 11*e* to 11*h* that capture images and inclination sensors 11*i* and 11*j* that can detect inclination are installed as the detection sensor unit 11 in the slip forming machine 2. The image sensors 11*e* to 11*h* are constituted by a plurality of (e.g., two) cameras 11*e* and 11*f* that are installed side by side so as to face downward on a side surface of the upper housing 3*e* of the cutting machine 2*d* and a plurality of (e.g., two) cameras 11*g* and 11*h* that are installed side by side so as to face downward on a side surface of the upper housing 3*h* of the molding machine 2*e*. Note that, in a case where the cutting machine 2*d* and the molding machine 2*e* are coupled, the camera 11*f* installed in the upper housing 3*e* of the cutting machine 2*d* and the camera 11*g* installed in the upper housing 3*h* of the molding machine 2*e* do not necessarily have to be separately provided, and a configuration is also possible in which a single camera is shared between the cutting machine and the molding machine. Also, the inclination sensors 11*i* and 11*j* are respectively arranged in the upper housing 3*e* of the cutting machine 2*d* and the upper housing 3*h* of the molding machine 2*e*.

Note that known cameras and known inclination sensors can be used as the cameras 11*e* to 11*h* and the inclination sensors 11*i* and 11*j*. Also, the slip forming machine 2 may also be provided with another detection sensor unit 11 in addition to the cameras and the inclination sensors.

Two-dimensional marker FIG. 1*c* that are identified based on image patterns are arranged as external indicators 1*a* at positions (positions of which coordinates are specified in advance) that serve as reference points in the work site area 1 in which the slip forming machine 2 is used. The marker FIG. 1*c* are targets of image capturing by the cameras 11*e* to 11*h*, and a plurality of marker FIG. 1*c* are arranged along a traveling direction of the slip forming machine 2 at predetermined intervals. Note that light emitting devices including two-dimensional light emitting surfaces that are identified based on light emission patterns or light emitting devices including point light sources that are identified based on flashing patterns may also be arranged instead of the marker FIG. 1*c*.

Also, marker FIG. 3*k* that serve as movable indicators are attached to the upper housing 3*e* constituting the movable work tool 3 of the cutting machine 2*d* and the upper housing 3*h* constituting the movable work tool 3 of the molding machine 2*e* so as to individually correspond to the cameras 11*e* to 11*h*. Similarly to the marker FIG. 1*c* that serve as the external indicators 1*a*, the marker FIG. 3*k* are targets of image capturing by the cameras 11*e* to 11*h*. Accordingly, it is preferable that the marker FIG. 3*k* are constituted by two-dimensional patterns that are different from those of the marker FIG. 1*c*. Note that light emitting devices including two-dimensional light emitting surfaces that are identified based on light emission patterns or light emitting devices including point light sources that are identified based on flashing patterns may also be provided instead of the marker FIG. 3*k*.

System Configuration Example

Next, a configuration example of the construction machine management system according to the second embodiment will be described.

Figure 14:
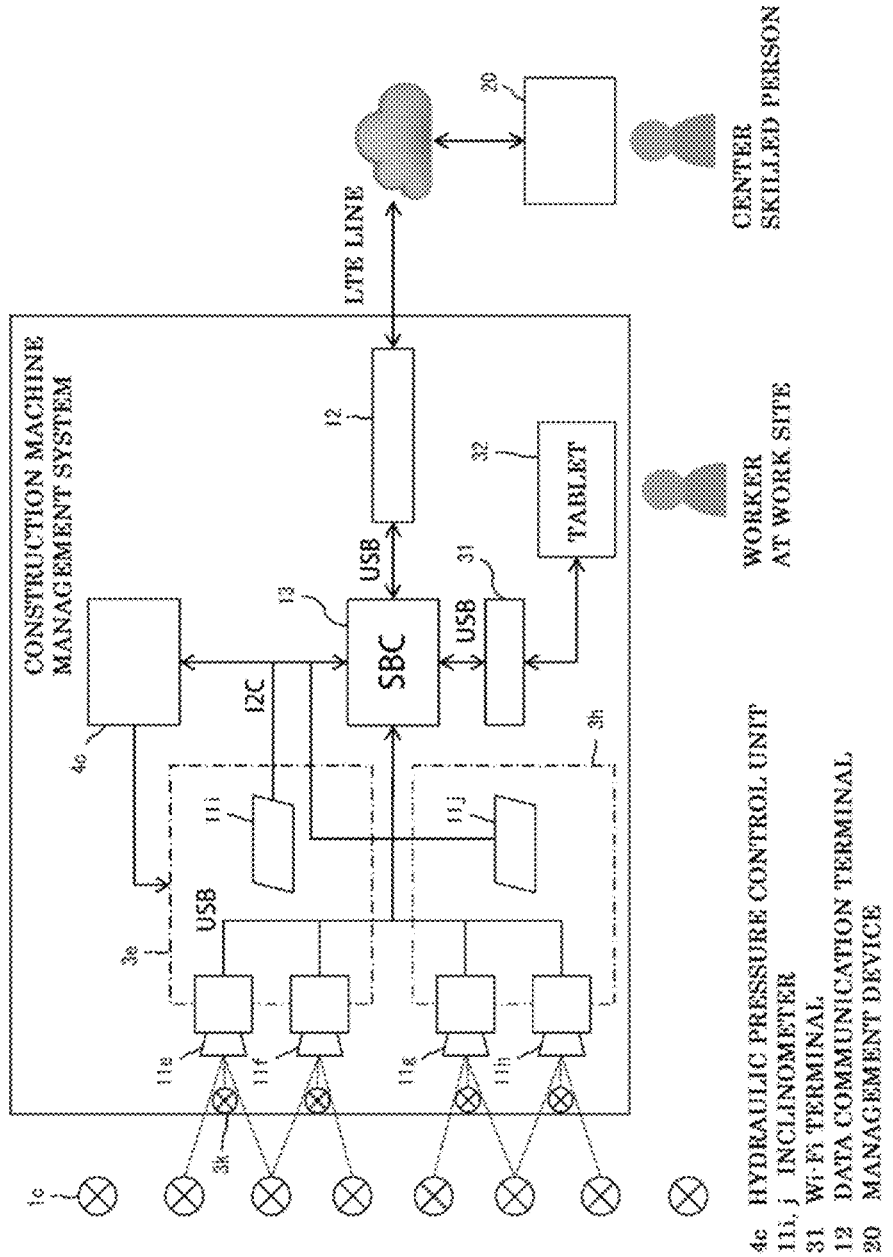
FIG. 14 is a block diagram showing a configuration example of a construction machine management system according to the second embodiment of the present invention.

FIG. 14 is a block diagram showing the configuration example of the construction machine management system according to the second embodiment.

The construction machine management system according to the second embodiment includes the cameras 11*e* and 11*f* and the inclination sensor 11*i* that function as the detection sensor unit 11 installed in the upper housing 3*e* of the cutting machine 2*d*, the cameras 11*g* and 11*h* and the inclination sensor 11*j* that function as the detection sensor unit 11 installed in the upper housing 3*h* of the molding machine 2*e*, and an SBC 13 that is connected to the cameras and the inclination sensors. The SBC 13 is only required to be installed in at least one of the cutting machine 2*d* and the molding machine 2*e*, and functions as the computer unit 13 described above.

Similarly to the first embodiment, the external management device 20 is connected to the SBC 13 via the data communication terminal 12, and the tablet terminal 32 is connected to the SBC 13 via the Wi-Fi terminal 31.

Furthermore, a hydraulic pressure control unit 4*c* that functions as the driving control unit 4 included in the slip forming machine 2 is connected to the SBC 13. The hydraulic pressure control unit 4*c* controls operations of the actuator 2*h* in the cutting machine 2*d* and the actuator 2*l* in the molding machine 2*e*.

Processing Operation Example

Next, an example of processing operations in the construction machine management system configured as described above, that is, a construction machine management method according to the second embodiment will be described.

Figure 15:
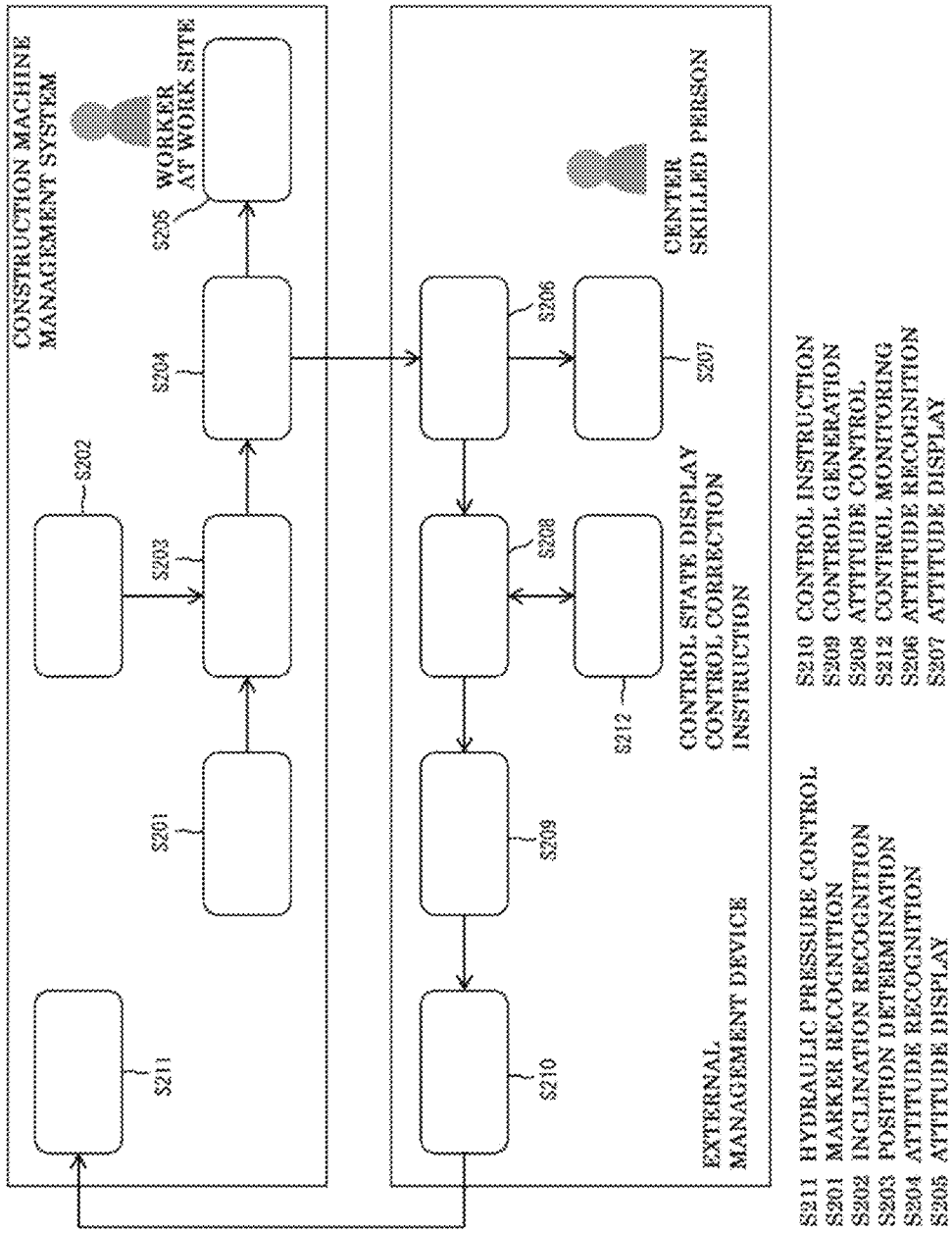
FIG. 15 is a flow diagram showing an example flow of a processing procedure of a construction machine management method according to the second embodiment of the present invention.

FIG. 15 is a flow diagram showing an example flow of a processing procedure of the construction machine management method according to the second embodiment.

In the construction machine management system configured as described above, marker recognition is initially performed with respect to the marker FIG. 1*c* installed in the work site area 1 and the marker FIG. 3*k* attached to the upper housings 3*e* and 3*h* (S201), in monitoring a position of work executed by the slip forming machine 2. More specifically, images of the marker FIGS. 1*c* and 3*k* are captured by the cameras 11*e* to 11*h* to obtain captured images of the marker FIGS. 1*c* and 3*k*. At this time, the cameras 11*e* to 11*h* each capture an image such that at least two marker FIG. 1*c* and a single marker FIG. 3k are included in the image. If an image of at least two marker FIG. 1c and a single marker FIG. 3k is captured, it is possible to perform position recognition using a surveying technique, which will be described later, based on an image capturing result obtained by each of the cameras He to 11h. Therefore, the marker FIG. 1c are arranged at the predetermined intervals that are set taking angles of view of the cameras 11e to 11h into account.

Furthermore, in the construction machine management system, the inclination sensor 11i performs inclination recognition with respect to the upper housing 3e of the cutting machine 2d and the inclination sensor 11j performs inclination recognition with respect to the upper housing 3h of the molding machine 2e (S202).

After marker recognition and inclination recognition are performed, in the construction machine management system, the function of the position recognition unit 13a in the SBC 13 performs position determination (position recognition) with respect to positions of work executed by the slip forming machine 2 (S203).

In the position determination, the position recognition unit 13a recognizes a position of work executed using the cutting machine 2d and a position of work executed using the molding machine 2e based on captured images of the marker FIGS. 1c and 3k. More specifically, positions of the upper housings 3e and 3h in which the cameras 11e to 11h are installed are recognized based on image capturing results respectively obtained by the cameras 11e to 11h, using the following surveying technique.

Figure 16:
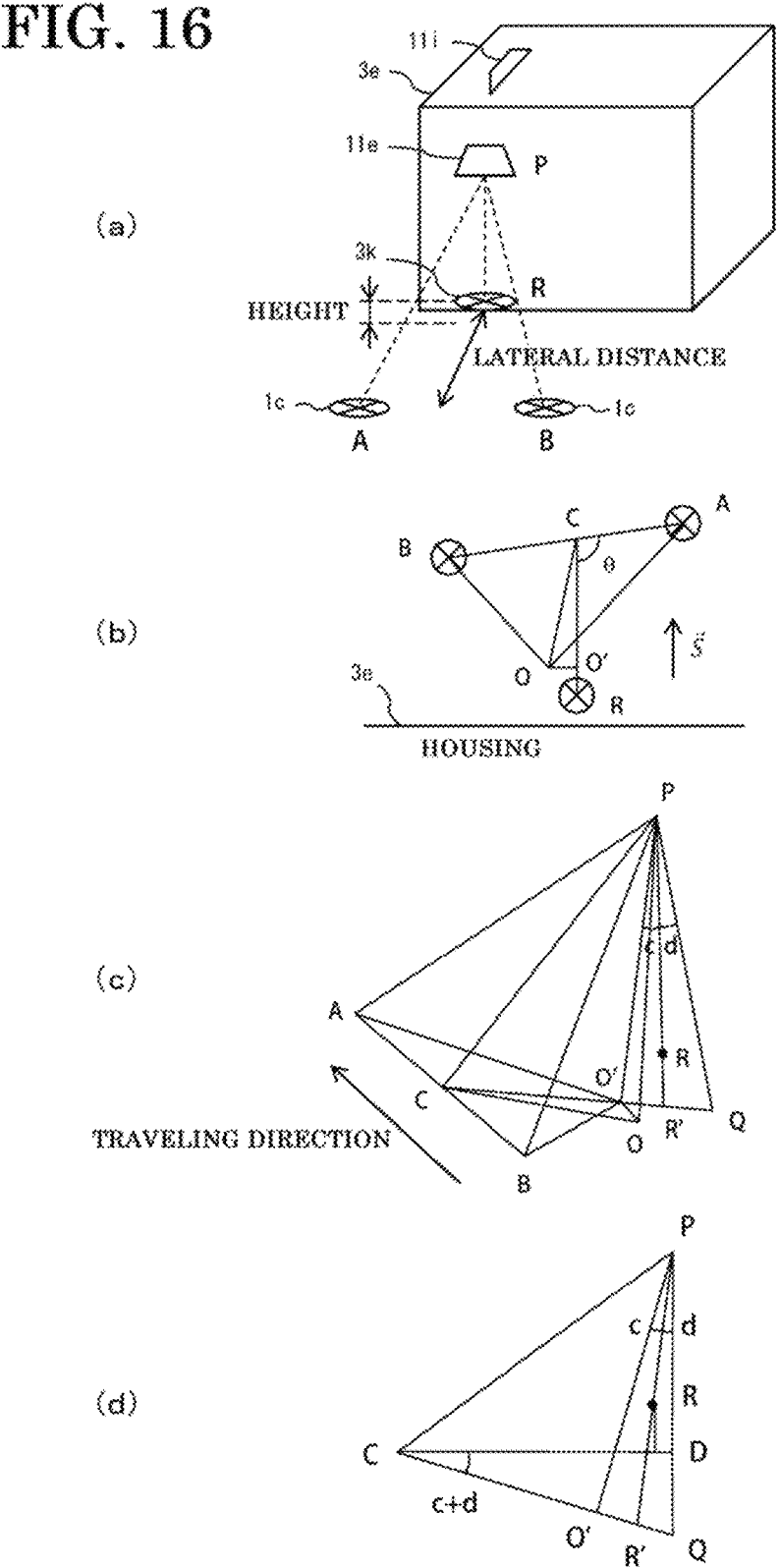
FIG. 16 is an illustrative diagram showing an outline of a surveying technique that is used in the second embodiment of the present invention.

FIG. 16 is an illustrative diagram showing an outline of the surveying technique used in the second embodiment.

Here, a technique for measuring a lateral distance and a height of the upper housing 3e of the cutting machine 2d based on an image of the marker FIGS. 1c and 3k captured by the camera 11e as shown in FIG. 16(a) will be described. Note that it goes without saying that the exact same surveying technique is applicable to images captured by the other cameras 11f to 11h as well.

In FIG. 16(a), P represents a position of the camera 11e, A and B respectively represent positions of two marker FIG. 1c, and R represents a position of the marker FIG. 3k. It is assumed that a distance AB between the marker FIG. 1c is specified when the marker FIG. 1c are installed, and is already known. A distance PR between the camera 11e and the marker FIG. 3k is specified when the camera 11e and the marker FIG. 3k are installed in the upper housing 3e, and is already known. Also, it is assumed that the camera 11e is installed in the upper housing 3e such that an optical axis extends in the vertical direction when the upper housing 3e is in a horizontal state and the optical axis passes the vicinity of the center of the marker FIG. 3k.

In FIGS. 16(b) to (d), O represents the center of the image captured by the camera 11e, and d represents an inclination angle (which is 0 in the horizontal state, and has a plus sign if the upper housing inclines toward the marker FIG. 1c) of the upper housing 3e.

Here, a case will be considered in which an actual distance between points I and J is denoted by IJ, a pixel distance between the points I and J in an image is denoted by IJp, and a characteristic value of the camera 11e that can be measured in advance to determine a distance to a subject from a size of the subject and a pixel distance of the subject is denoted by k. Also, when the camera 11e is installed, a suitable vector that intersects with a camera installation surface of the upper housing 3e at right angles on a horizontal plane and is directed from the upper housing 3e toward the marker FIG. 1c is determined as a vector S in a camera coordinate system. C represents an intersection point between a straight line that extends from R in the direction of the vector S and a line segment AB in the camera coordinate system. Also, a foot of a perpendicular line that extends from O to a line segment RC in the camera coordinate system is represented by O'.

Real coordinates of C can be found from A and B through proportional division between $AC_P$ and $BC_P$. Note that $\angle ACO'$ in the camera coordinate system is denoted by θ. R' represents R projected onto a plane that is perpendicular to the optical axis PO and includes C. O' is treated on the same plane.

In this case, the following relational expressions hold true.

$$OO' = \frac{OO'_P}{AB_P}AB, CO = \frac{CO_P}{AB_P}AB, PO = \frac{CO}{CO_P}k \quad \text{[Math. 2]}$$

$$PO' = \sqrt{PO^2 + OO'^2}$$

$$R'O' = \frac{R'O'_P}{AB_P}AB, c = \arctan\frac{R'O'}{PO'}$$

$$CO' = \frac{CO'_P}{AB_P}AB, QO' = PO'\tan(c+d)$$

$$CD = (CO' + QO')\cos(c+d)$$

$$PD = PQ - QD = \frac{PO'}{\cos(c+d)} - CD\tan(c+d)$$

Based on the above relational expressions, it is possible to determine a lateral distance CD and a height PD with respect to a position in the upper housing 3e at which the camera 11e is installed, based on a relationship between the position of the camera 11e, positions of the two marker FIG. 1c, and the position of the marker FIG. 3k.

If the distance CD and the height PD are found, the point R representing the position of the marker FIG. 3k can be determined based on the distance CD and the height PD. The point R representing the position of the marker FIG. 3k is a point on a straight line that extends from the point C toward the upper housing 3e, forming the angle θ with respect to the line segment AB, and the point R is at a distance CD-PR sin(d) from the point C toward the upper housing 3e and at a height PD-PR cos(d) from the point C.

That is, the position recognition unit 13a takes the points A and B of the marker FIG. 1c to be absolute positions and takes the point R of the marker FIG. 3k relative to the points A and B to be a relative position, and calculates and recognizes a three-dimensional coordinate position of a predetermined portion of the upper housing 3e (specifically, the position of the point R to which the marker FIG. 3k is attached) that serves as a reference point when specifying the position of the upper housing 3e based on detection results regarding the marker FIGS. 1c and 3k using the above-described surveying technique.

The position recognition unit 13a performs the position recognition processing described above with respect to not only the detection result obtained by the camera 11e but also detection results obtained by the other cameras 11f to 11h in the exact same manner. Thus, the position recognition unit 13a obtains recognition results of three-dimensional coordinate positions of predetermined portions of the upper housings 3e and 3h that respectively correspond to the cameras 11e to 11h.

In the position determination, after obtaining position recognition results regarding the portions corresponding to the cameras 11e to 11h, the position recognition unit 13a next recognizes position information regarding the upper housings 3e and 3h by combining the position recognition results.

More specifically, in the case of the upper housing 3e, for example, three-dimensional coordinate positions of the marker FIG. 3k (points R) at two positions in the upper housing 3e are specified from a position recognition result based on a detection result obtained by the camera 11e and a position recognition result based on a detection result obtained by the camera 11f, and therefore the position recognition unit 13a recognizes the position, orientation, and attitude (a state of inclination) of the upper housing 3e in the work site area 1 based on the three-dimensional coordinate positions. At this time, the position recognition unit 13a recognizes the attitude of the upper housing 3e based on a detection result obtained by the inclination sensor iii.

As described above, the position recognition unit 13a recognizes position information regarding the upper housing 3e by combining the position recognition result based on the detection result obtained by the camera 11e and the position recognition result based on the detection result obtained by the camera 11f, and further based on the detection result obtained by the inclination sensor iii. Thus, with respect to the cutting machine 2d, it is possible to obtain a monitoring result of an absolute position of work executed using the upper housing 3e, the excavation drum 3f, and the cutter bits 3g, which function as the movable work tool 3, in the work site area 1 relative to positions of the marker FIG. 1c that serve as reference points.

Also, in the case of the upper housing 3h, for example, three-dimensional coordinate positions of two positions in the upper housing 3h are specified from a position recognition result based on a detection result obtained by the camera 11g and a position recognition result based on a detection result obtained by the camera 11h, and therefore the position recognition unit 13a recognizes the position, orientation, and attitude (a state of inclination) of the upper housing 3h in the work site area 1 based on the three-dimensional coordinate positions. At this time, the position recognition unit 13a recognizes the attitude of the upper housing 3h based on a detection result obtained by the inclination sensor 11j.

As described above, the position recognition unit 13a recognizes position information regarding the upper housing 3h by combining the position recognition result based on the detection result obtained by the camera 11g and the position recognition result based on the detection result obtained by the camera 11h, and further based on the detection result obtained by the inclination sensor 11j. Thus, with respect to the molding machine 2e, it is possible to obtain a monitoring result of an absolute position of work executed using the upper housing 3h and the mold 3i, which function as the movable work tool 3, in the work site area 1 relative to positions of the marker FIG. 1c that serve as reference points.

Thereafter, in the construction machine management system, the function of the difference information extraction unit 13c in the SBC 13 recognizes the attitude of the slip forming machine 2 relative to work plan data of the work site area 1 (S204) as shown in FIG. 15. More specifically, monitoring results regarding positions of work executed using the cutting machine 2d and the molding machine 2e of the slip forming machine 2 are compared with coordinate values of corresponding positions in the work plan data of the work site area 1, and difference information regarding differences between the monitoring results and the coordinate values is extracted.

After the difference information is extracted, in the construction machine management system, the function of the guidance output unit 13d in the SBC 13 performs machine guidance processing operations and outputs operation guidance information to display the attitude of the slip forming machine 2 to a worker who handles the slip forming machine 2 at the work site (S205).

The operation guidance information is output in the following manner, for example.

Figure 17:
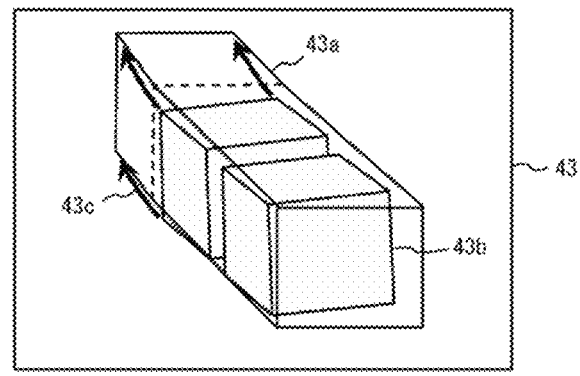
FIG. 17 is an illustrative diagram showing an example of operation guidance information that is output by the construction machine management system according to the second embodiment of the present invention.

FIG. 17 is an illustrative diagram showing an example of the operation guidance information that is output by the construction machine management system according to the second embodiment.

It is conceivable to output the operation guidance information using a display screen 43 shown in FIG. 17, for example. In the display screen 43 of the illustrated example, an image 43b that represents the slip forming machine 2 is displayed at a position that reflects the extracted difference information relative to a work execution surface 43a that is drawn based on the work plan data. A guide line (guidance curve) 43c for guiding current positions of the cutting machine 2d and the molding machine 2e of the slip forming machine 2 to the work execution surface 43a may also be displayed in the display screen 43. Furthermore, related numerical values (e.g., coordinate values) may also be displayed in the display screen 43.

Outputting the operation guidance information using the display screen 43 is very convenient for the worker at the work site in terms of making the positions of work executed using the cutting machine 2d and the molding machine 2e of the slip forming machine 2 match the work plan data.

Note that recognition of the attitude of the slip forming machine 2 relative to the work plan data (S206) and display of the attitude of the slip forming machine 2 through output of the operation guidance information (S207) may also be performed in the external management device 20 as shown in FIG. 15. If the operation guidance information is output to the external management device 20, even if the worker who actually operates the slip forming machine 2 at the work site is not skilled, for example, a center skilled person who is at a remote place can give advice regarding operations to the unskilled worker while grasping conditions of work executed by the slip forming machine 2.

Also, the external management device 20 may perform machine control processing operations separately from or in addition to the machine guidance processing operations. More specifically, the external management device 20 performs processing (i.e., attitude control in FIG. 15) for generating a movement curve for moving the cutting machine 2d and the molding machine 2e of the slip forming machine 2 to the work execution surface (S208), and performs processing (i.e., control generation in FIG. 15) for constituting motions for realizing the movement by sequences of hydraulic operations of the actuators 2h and 2l and the like (S209). Then, processing (i.e., control instruction in FIG. 15) for giving motion instructions according to the sequences to the hydraulic pressure control unit 4c is performed (S210). Upon receiving the motion instructions, the hydraulic pressure control unit 4c causes the actuators 2h and 2l to operate as necessary (S211) to guide the upper housing 3e, the excavation drum 3f, and the cutter bits 3g of the cutting machine 2d and the upper housing 3h and the mold 3i of the cutting machine 2e to predetermined positions.

Through the machine control processing operations described above, positions of the cutting machine 2d and the molding machine 2e can be automatically adjusted such that the upper housing 3e, the excavation drum 3f, and the cutter bits 3g of the cutting machine 2d and the upper housing 3h and the mold 3i of the cutting machine 2e move along the work execution surface. That is, automated operation of the slip forming machine 2 is performed with respect to motions, attitude, and the like such that positions of work executed using the cutting machine 2d and the molding machine 2e match the work plan data.

Note that, in the case where the machine control processing operations are performed, attitude control (S208), control generation (S209), and control instruction (S210) are performed by the external management device 20 in this example, but these types of processing may also be performed by the SBC 13 of the slip forming machine 2.

A configuration is also possible in which the motion plan information (movement curve, etc.) generated in the attitude control (S208) is used in the external management device 20 to monitor control (S212). This configuration makes it possible to assist in controlling motions, attitude, and the like of the slip forming machine 2 through the external management device 20, for example. Accordingly, the center skilled person who is at a remote place can correct contents of control performed on the slip forming machine 2 as appropriate while grasping conditions of work executed by the slip forming machine 2, and therefore accuracy, reliability, and the like of the automated operation of the slip forming machine 2 can be enhanced.

Operations and Effects

According to the second embodiment described above, it is possible to autonomously monitor positions of work executed using the cutting machine 2d and the molding machine 2e of the slip forming machine 2 by using the detection sensor unit 11 installed in the slip forming machine 2, and therefore operations and effects that are substantially the same as those in the above-described first embodiment can be achieved.

Also, in the second embodiment, the plurality of cameras 11e and 11f are installed as the detection sensor unit 11 in the upper housing 3e of the cutting machine 2d, and the plurality of cameras 11g and 11h are installed as the detection sensor unit 11 in the upper housing 3h of the molding machine 2e. Each of the cameras 11e to 11h detects at least two marker FIG. 1c and a single marker FIG. 3k. That is, the image sensors are constituted by the plurality of (e.g., two for each housing) cameras 11e to 11h that are installed side by side so as to face the same direction, and the cameras 11e to 11h each detect a plurality of indicators (specifically, two marker FIG. 1c and a single marker FIG. 3k). In the position determination, the position recognition unit 13a performs position recognition individually with respect to detection results obtained by the cameras 11e to 11h and recognizes position information regarding the upper housings 3e and 3h by combining position recognition results as appropriate. Accordingly, in the second embodiment, not only a three-dimensional coordinate position but also orientation, attitude (a state of inclination), or the like can also be recognized for each of the upper housings 3e and 3h from the detection results obtained by the cameras 11e to 11h, and accuracy of the recognition is high.

Also, in the second embodiment, a plurality of marker FIG. 1c that are arranged at predetermined intervals are used as the external indicators 1a. This is very suitable for a case where an elongated concrete structure is continuously formed using the slip forming machine 2 having the self-propelling function. For example, in the slip-form construction method, there are cases where a sensor line that is constituted by an elongated continuous body is arranged along a traveling direction of the slip forming machine 2 and the slip forming machine 2 is moved along the sensor line. In contrast, if the plurality of marker FIG. 1c are used as the external indicators 1a, it is possible to move the slip forming machine 2 with high accuracy by arranging the marker FIG. 1c in a scattered manner without arranging a continuous body. Furthermore, unlike the case of the sensor line, attitude (inclination) can also be recognized. Therefore, the present embodiment is very suitable for a case where work is executed while a construction machine is moved in a predetermined direction as is the case with the slip-form construction method.

4. Other Embodiments

The embodiments of the present invention have been specifically described so far, but the technical scope of the present embodiment is not limited to the embodiments described above, and various changes can be made within a scope not departing from the gist of the present invention.

For example, the hydraulic excavator 2 and the slip forming machine 2 are respectively described as examples of construction machines in the first embodiment and the second embodiment, but the technical scope of the present invention is not limited to these examples. That is, the present invention is applicable to various types of construction machines such as machines for civil engineering, transporting machines, cargo-handling machines, foundation work machines, boring machines, tunnel construction machines, concrete machines such as a crusher, paving machines, road maintenance machines, snow compactors, and self-propelling mowers.

In a case where the construction machine is a snow compactor, if external indicators are disposed in a ski slope, for example, the snow compactor can autonomously monitor a position of work (snow compacted position) executed using a blade of the snow compactor. In a case where the construction machine is a self-propelling mower, if external indicators are disposed in a golf course, for example, the self-propelling mower can autonomously monitor a position of work (mowed position) executed using a cutter blade of the self-propelling mower.

In the first embodiment, a case where the marker FIG. 1b is attached to the external indicator 1a is described as an example, but the technical scope of the present invention is not limited to such a case. That is, even if the marker FIG. 1b is not attached, if a leveling rod or an equivalent thereof is used as the external indicator 1a, for example, it is possible to specify the position of the reference point at which the external indicator 1a is disposed by analyzing an image of a scale or the like of the leveling rod.

In the first and second embodiments, cases where the image sensors (cameras) 11a, 11b, and 11e to 11h are used as the detection sensor unit 11 are described as examples, but the technical scope of the present invention is not limited to such cases. That is, instead of or in addition to the image sensors, another sensor may also be used as the detection sensor unit 11 so long as at least the position of the construction machine can be recognized using the sensor.

For example, it is conceivable to use an infrared camera or an infrared sensor as the other sensor. If infrared rays are used, it is possible to recognize a position with high accuracy even under unusual environments such as nighttime and a tunnel construction site while suppressing influence of lighting or the like.

Also, it is conceivable to use, for example, a plurality of GPS devices of an independent measurement type as other sensors that enable position recognition. In recent years, inexpensive GPS devices of the independent measurement type are distributed, and it is possible to perform position recognition with a high accuracy on the order of at least several centimeters by using a plurality of GPS devices owing to a characteristic of the GPS devices being able to recognize positions of the GPS devices relative to each other with high accuracy.

In the first and second embodiments, cases where the image sensors (cameras) 11a, 11b, and 11e to 11h and the inclination sensors 11c, 11d, 11i, and 11j are used in combination as the detection sensor unit 11 are described as examples, but the technical scope of the present invention is not limited to such cases. For example, even if the detection sensor unit 11 is only constituted by the image sensors (cameras), it is possible to recognize a position based on detection results obtained by the image sensors. However, if the image sensors (cameras) and the inclination sensors are used in combination as described in the first and second embodiments, it is possible to recognize a position with high accuracy while keeping the configuration of the detection sensor unit 11 from becoming complex.

In the first embodiment, a case is described as an example in which a position of work executed using the bucket 3d is recognized in the second recognition processing based on an image capturing result regarding the marker FIG. 3a that functions as the movable indicator, but, if inclination sensors are respectively provided in the first arm 3b, the second arm 3c, and the bucket 3d, for example, the position may also be recognized using detection results obtained by the inclination sensors. This is because it is possible to specify the position of the pointed end of the bucket 3d by combining detection results of rotation angles of the first arm 3b, the second arm 3c, and the bucket 3d.

In the second embodiment, a case where a concrete structure (e.g., U-shaped trench) is formed using the slip-form construction method is described as an example, but the present invention is also applicable in the exact same manner to cases where the target of work is a curbstone, a street gutter, a circular water channel, a guard fence, or a pavement surface, other than the U-shaped trench.

In the second embodiment, a case where the cutting machine 2d and the molding machine 2e mainly cooperate with each other is described, but the cutting machine 2d and the molding machine 2e may also operate as separate construction machines. In this case, machine guidance processing operations and machine control processing operations are separately performed on the cutting machine and the molding machine.

In the second embodiment, a case is described as an example in which hydraulic operations and the like of the actuators 2h and 2l are controlled in the machine control processing operations, but motions of the travel apparatus 2f of the cutting machine 2d or the travel apparatus 2j of the molding machine 2e may also be controlled, for example.

In the second embodiment, a case is described as an example in which the present invention is applied to the slip forming machine 2 that is used in the slip-form construction method, but the present invention is applicable in the exact same manner to a construction machine that is used in another construction method, such as a front housing and a rear housing of an open shield machine (open pit machine), so long as the construction machine executes work while moving in a traveling direction.

In the above-described embodiments, cases where the technical idea of the present invention is embodied as a "construction machine management system" are described, but there is no limitation to such cases.

For example, the present invention can also be realized as a "construction machine management program" that causes a computer to execute autonomous monitoring processing regarding a construction machine as described in the embodiments. That is, the present invention can be realized as a construction machine management program for causing a computer connected to a detection sensor unit installed in a construction machine that is movable in a work site area to function as a position recognition means for recognizing position information regarding a position of work executed in the work site area using a movable work tool that is included in the construction machine, based on a detection result obtained by the detection sensor unit with respect to an external indicator installed in the work site area and a detection result obtained by the detection sensor unit with respect to a movable indicator that is attached to the movable work tool.

Also, the present invention can also be realized as a "construction machine management method" for performing autonomous monitoring processing regarding a construction machine as described in the embodiments. That is, the present invention can also be realized as a construction machine management method including by using a detection sensor unit installed in a construction machine that is movable in a work site area, recognizing position information regarding a position of work executed in the work site area using a movable work tool that is included in the construction machine, based on a detection result obtained by the detection sensor unit with respect to an external indicator installed in the work site area and a detection result obtained by the detection sensor unit with respect to a movable indicator that is attached to the movable work tool.

Also, the present invention can also be realized as a "construction machine" that includes a function for performing autonomous monitoring processing as described in the embodiments. That is, the present invention can also be realized as a construction machine that is movable in a work site area, the construction machine including;

a detection sensor unit that is installed in the construction machine; and a computer unit that is connected to the detection sensor unit, wherein the computer unit includes a position recognition unit configured to recognize position information regarding a position of work executed in the work site area using a movable work tool that is included in the construction machine, based on a detection result obtained by the detection sensor unit with respect to an external indicator installed in the work site area and a detection result obtained by the detection sensor unit with respect to a movable indicator that is attached to the movable work tool.

Also, the present invention can also be realized as "an external management device for a construction machine" that is configured to exchange information with the construction machine and perform autonomous monitoring processing regarding the construction machine as described in the embodiments. That is, the present invention can also be realized as an external management device for a construction machine that is movable in a work site area, the external management device being disposed away from the construction machine and configured to exchange information with the construction machine, wherein the external management device is configured to output at least one of a recognition result and information derived from the recognition result, the recognition result being a recognition result of position information regarding a position of work executed in the work site area using a movable work tool that is included in the construction machine, the position information being recognized by using a detection sensor unit that is installed in the construction machine movable in the work site area, based on a detection result obtained by the detection sensor unit with respect to an external indicator installed in the work site area and a detection result obtained by the detection sensor unit with respect to a movable indicator that is attached to the movable work tool.

REFERENCE SIGNS LIST

1 Work site area
1a External indicator
1b, 1c Marker figure
2 Construction machine (hydraulic excavator, slip forming machine)
2a Right endless track
2b Left endless track
2c Machine base
2d Front-side cutting machine
2e Rear-side molding machine
2f Travel device
2g Vehicle body portion
2h Actuator
3 Movable work tool
3a, 3k Movable indicator (marker FIG.
3b First arm
3c Second arm
3d Bucket
3e Upper housing
3f Excavation drum
3g Cutter bit
3h Upper housing
3i Mold
3j Vibrator
11 Detection sensor unit
11a, 11b, 11e to 11h Image sensor (camera)
11c, 11d, 11i, 11j Inclination sensor
12 Information communication unit (data communication terminal)
13 Computer unit (SBC)
13a Position recognition unit
13b Data acquisition unit
13c Difference information extraction unit
13d Guidance output unit
13e Motion plan generation unit
13f Motion instruction unit
20 External management device

The invention claimed is:

1. A construction machine management system comprising:
a detection sensor installed in a construction machine that is movable in a work site area, the detection sensor being configured to detect:
an external indicator that is installed at a reference point which is specified in advance in the work site area, and
a movable indicator that is attached to a movable work tool included in the construction machine; and
a computer configured to recognize:
a positional relationship between a position of the external indicator and a position of the detection sensor, and
a positional relationship between a position of the movable indicator and the position of the detection sensor,
by performing a surveying calculation using a positional relationship between (i) the position of the external indicator, (ii) the position of the movable indicator, and (iii) the position of the detection sensor,
based on
a detection result detected by the detection sensor with respect to the external indicator and
a detection result detected by the detection sensor with respect to the movable indicator,
the computer being configured to:
further recognize a positional relationship between the position of the movable indicator and a position of work executed using the movable work tool, and
combine recognition results regarding the positional relationships to recognize position information that includes a three-dimensional coordinate value of the position of the work executed using the movable work tool in the work site area relative to the reference point.

2. The construction machine management system according to claim 1, wherein
the computer recognizes the position information including the three-dimensional coordinate value of the position of work by sequentially performing first recognition processing for recognizing position information of the construction machine based on the positional relationship between the position of the external indicator and the position of the detection sensor and second recognition processing for recognizing position information of the position of the work executed using the movable work tool based on the positional relationship between the position of the movable indicator and the position of the detection sensor.

3. The construction machine management system according to claim 1, wherein
the detection sensor is installed in the construction machine configured to execute work while moving in a predetermined direction.

4. The construction machine management system according to claim 1, wherein
the position information recognized by the computer includes at least one of an attitude and an orientation of the movable work tool.

5. The construction machine management system according to claim 1, wherein
the computer is further configured to compare a recognition result obtained using the positional relationship between the position of the moveable indicator and the position of the detection sensor with work plan data regarding the work site area, and extract a difference of the position of work relative to the work plan data as difference information.

6. The construction machine management system according to claim 5, wherein the computer is further configured to output operation guidance information for the movable work tool, the operation guidance information being generated based on the difference information.

7. The construction machine management system according to claim 5, wherein the computer is further configured to:
based on the difference information, generate motion plan information for the movable work tool for making the position of the work match the work plan data; and
based on the motion plan information, give a motion instruction to a driving controller included in the construction machine.

8. The construction machine management system according to claim 5, further comprising
an information communicator configured to exchange information with an external management device that is disposed away from the construction machine, wherein information exchanged by the information communicator includes at least one of the difference information and information derived from the difference information.

9. The construction machine management system according to claim 1, wherein the detection sensor includes an image sensor that captures an image, and the computer is configured to recognize the position information by performing recognition processing on the image captured by the image sensor.

10. A non-transitory computer readable medium storing a construction machine management program executed by a computer connected to a detection sensor installed in a construction machine that is movable in a work site area, the detection sensor being configured to detect:
an external indicator that is installed at a reference point which is specified in advance in the work site area, and
a movable indicator that is attached to a movable work tool included in the construction machine,
the program causing the computer to recognize:
a positional relationship between a position of the external indicator and a position of the detection sensor, and
a positional relationship between the position of the movable indicator and the position of the detection sensor,
by performing a surveying calculation using a positional relationship between (i) the position of the external indicator, (ii) the position of the movable indicator, and (iii) the position of the detection sensor,
based on
a detection result detected by the detection sensor with respect to the external indicator and
a detection result detected by the detection sensor with respect to the movable indicator,
the program further causing the computer to:
recognize a positional relationship between the position of the movable indicator and a position of work executed using the movable work tool, and
combine recognition results regarding the positional relationships to recognize position information that includes a three-dimensional coordinate value of the position of the work executed using the movable work tool in the work site area relative to the reference point.

11. A construction machine management method comprising:
detecting, by using a detection sensor installed in a construction machine that is movable in a work site area:
an external indicator that is installed at a reference point which is specified in advance in the work site area, and
a movable indicator that is attached to a movable work tool included in the construction machine, and
recognizing, by a computer:
a positional relationship between a position of the external indicator and a position of the detection sensor, and
a positional relationship between a position of the movable indicator and the position of the detection sensor,
by performing a surveying calculation using a positional relationship between (i) the position of the external indicator, (ii) the position of the movable indicator, and (iii) the position of the detection sensor,
based on
a detection result detected by the detection sensor with respect to the external indicator and
a detection result detected by the detection sensor with respect to the movable indicator,
further recognizing, by the computer, a positional relationship between a position of the movable indicator and a position of work executed using the movable work tool, and
combining, by the computer, recognition results regarding the positional relationships to recognize position information that includes a three-dimensional coordinate value of the position of the work executed using the movable work tool in the work site area relative to the reference point.

12. A construction machine that is movable in a work site area, comprising:
a detection sensor installed in the construction machine, the detection sensor being configured to detect:
external indicator that is installed at a reference point which is specified in advance in the work site area, and
a movable indicator that is attached to a movable work tool included in the construction machine; and
a computer that is connected to the detection sensor, wherein
the computer is configured to recognize:
a positional relationship between a position of the external indicator and a position of the detection sensor, and
a positional relationship between a position of the movable indicator and the position of the detection sensor,
by performing a surveying calculation using a positional relationship between (i) the position of the external indicator, (ii) the position of the movable indicator, and (iii) the position of the detection sensor,
based on
a detection result detected by the detection sensor with respect to the external indicator and
a detection result detected by the detection sensor with respect to the movable indicator,
the computer being configured to:
further recognize a positional relationship between the position of the movable indicator and a position of work executed using the movable work tool, and
combine recognition results regarding the positional relationships to recognize position information that includes a three-dimensional coordinate value of the position of the work executed using the movable work tool in the work site area relative to the reference point.

13. An external management device for a construction machine that is movable in a work site area, the external management device being disposed away from the construction machine and configured to exchange information with the construction machine, wherein the external management device is configured to output at least one of a recognition result and information derived from the recognition result, the recognition result being based on position information that includes a three-dimensional coordinate value of a position of work executed using a movable work tool included in the construction machine in the work site area relative to a reference point which is specified in advance in the work site area, the position information being recognized by, using a detection sensor installed in the construction machine movable in the work site area, the detection sensor being configured to detect:

an external indicator that is installed at the reference point, and a movable indicator that is attached to the movable work tool, and the external management device recognizing a positional relationship between a position of the external indicator and a position of the detection sensor, and a positional relationship between a position of the a movable indicator and the position of the detection sensor, by performing a surveying calculation using a positional relationship between (i) the position of the external indicator, (ii) the position of the movable indicator, and (iii) the position of the detection sensor, based on a detection result detected by the detection sensor with respect to the external indicator and a detection result detected by the detection sensor with respect to the movable indicator, the external management device:

further recognizing a positional relationship between the position of the movable indicator and the position of work executed using the movable work tool, and combining recognition results regarding the positional relationships.

\* \* \* \* \*